US010732702B2

(12) United States Patent
Takahashi

(10) Patent No.: US 10,732,702 B2
(45) Date of Patent: Aug. 4, 2020

(54) DATA PROCESSING APPARATUS, METHOD OF CONTROLLING DATA PROCESSING APPARATUS, AND RECORDING MEDIUM

(71) Applicant: KONICA MINOLTA, INC., Chiyoda-ku, Tokyo (JP)

(72) Inventor: Kenichi Takahashi, Osaka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 350 days.

(21) Appl. No.: 15/791,482

(22) Filed: Oct. 24, 2017

(65) Prior Publication Data

US 2018/0120925 A1 May 3, 2018

(30) Foreign Application Priority Data

Oct. 31, 2016 (JP) ................................ 2016-212849

(51) Int. Cl.
*G06F 1/26* (2006.01)
*G06F 1/3293* (2019.01)
(Continued)

(52) U.S. Cl.
CPC ............ *G06F 1/3293* (2013.01); *G06F 1/263* (2013.01); *G06F 1/28* (2013.01); *G06F 1/30* (2013.01);
(Continued)

(58) Field of Classification Search
None
See application file for complete search history.

(56) References Cited

U.S. PATENT DOCUMENTS

2002/0021914 A1* 2/2002 Serizawa ............ G03G 21/1889
399/75
2002/0095610 A1* 7/2002 Nunomura ............ G06F 1/3203
713/322
(Continued)

FOREIGN PATENT DOCUMENTS

CN 1185212 6/1998
CN 1987736 6/2007
(Continued)

OTHER PUBLICATIONS

Notification of the First Office Action issued in corresponding Chinese Patent Application No. 2017110553777, dated Jan. 28, 2019, with English Translation (28 pages).
(Continued)

*Primary Examiner* — Paul Yen
(74) *Attorney, Agent, or Firm* — Buchanan Ingersoll & Rooney PC

(57) ABSTRACT

A data processing apparatus includes a first processor, a second processor, a first power source which performs electric power supply to the first processor, a second power source which preforms electric power supply to the second processor, a detector which detects an abnormality of the second power source, and a switcher which is capable of switching a power supply target of the first power source between the first processor and the second processor. When an abnormality of the second power source is detected, the first processor stops an operation of the first processor, and the switcher switches the power supply target of the first power source from the first processor to the second processor after the operation of the first processor is stopped.

27 Claims, 18 Drawing Sheets

(51) Int. Cl.
*G06F 1/30* (2006.01)
*G06F 1/28* (2006.01)
*G06F 1/3206* (2019.01)
*G06F 1/3287* (2019.01)
*G06F 1/3296* (2019.01)

(52) U.S. Cl.
CPC .......... *G06F 1/3206* (2013.01); *G06F 1/3287* (2013.01); *G06F 1/3296* (2013.01)

(56) References Cited

U.S. PATENT DOCUMENTS

2007/0174698 A1* 7/2007 Bailey ................. G06F 1/28
714/22
2012/0079321 A1* 3/2012 Williams ............. G06F 1/30
714/14

FOREIGN PATENT DOCUMENTS

| | | |
|---|---|---|
| CN | 101118459 | 2/2008 |
| CN | 202661853 | 1/2013 |
| CN | 103795776 | 5/2014 |
| CN | 13972976 | 8/2014 |
| CN | 104076633 | 10/2014 |
| JP | 2008-228187 A | 9/2008 |
| JP | 2011-238108 | 11/2011 |

OTHER PUBLICATIONS

Office Action issued in corresponding Chinese Patent Application No. 2017110553777, dated Sep. 11 2019 (10 pages).

Office Action issued in corresponding Chinese Patent Application No. 2017110553777, dated Jun. 18, 2019 (8 pages).

Office Action issued in corresponding Chinese Patent Application No. 2017110553777.7, dated Dec. 30, 2019, with English Translation (22 pages).

Notice of Reasons for Refusal issued in corresponding Japanese Patent Application No. 2016-212849, dated Jun. 9, 2020, with English Translation (8 pages).

* cited by examiner

Fig.13

STATE OF RECEIVED JOB AND PROCESSING TIME

| RECEIVED JOB | STATE | PROCESSING TIME | |
|---|---|---|---|
| J1: SCAN TRANSMISSION 1 | IN EXECUTION | t1 | |
| J2: PRINT 1 | IN EXECUTION | t2 | (t2 < t1 < t3) |
| J3: PRINT 2 | IN EXECUTION | t3 | |
| J4: PRINT 3 | WAITING (UNSTARTED) | t4 | |
| J5: PRINT 4 | WAITING | t5 | (t5 < t6 < t4) |
| J6: COPY 1 | WAITING | t6 | |

Fig. 14

<CASE GROUPING PROCESS>

| CASE | CASE GROUPING CONDITION | PROCESSING CONTENT |
|---|---|---|
| C1 | ALL RECEIVED JOBS CAN BE COMPLETED | T0 ≧ T30 AND T0 ≧ T20 | EXECUTE ALL RECEIVED JOBS |
| C2 | ALL RUNNING JOBS CAN BE COMPLETED | T0 < T30 AND T0 ≧ T20 | EXECUTE (CONTINUE) ALL RUNNING JOBS, SELECT JOB WHICH CAN BE COMPLETED AMONG UNSTARTED JOBS AND EXECUTE SELECTED JOB, AND SAVE NON-SELECTED JOBS AMONG UNSTARTED JOBS |
| C3 | SOME RUNNING JOBS CAN BE COMPLETED | T0 < T30 AND T20 > T0 > MIN(t1, t2, t3) | SELECT SOME RUNNING JOBS WHICH CAN BE COMPLETED AND EXECUTE (CONTINUE) SELECTED JOB, SUSPEND NON-SELECTED JOBS AMONG RUNNING JOBS, AND SAVE NON-SELECTED JOBS AND UNSTARTED JOBS |
| C4 | ANY ONE RUNNING JOB CANNOT BE COMPLETED | T0 < T30 AND T0 < MIN(t1, t2, t3) | SUSPEND ALL JOBS IN EXECUTION AND SAVE ALL RECEIVED JOBS |

*T0: SERVER OPERABLE TIME BY ELECTRIC POWER SUPPLY FROM POWER STORAGE PART 55
T20: TOTAL TIME REQUIRED TO COMPLETE ALL RUNNING JOBS
T30: TOTAL TIME REQUIRED TO COMPLETE ALL RECEIVED JOBS

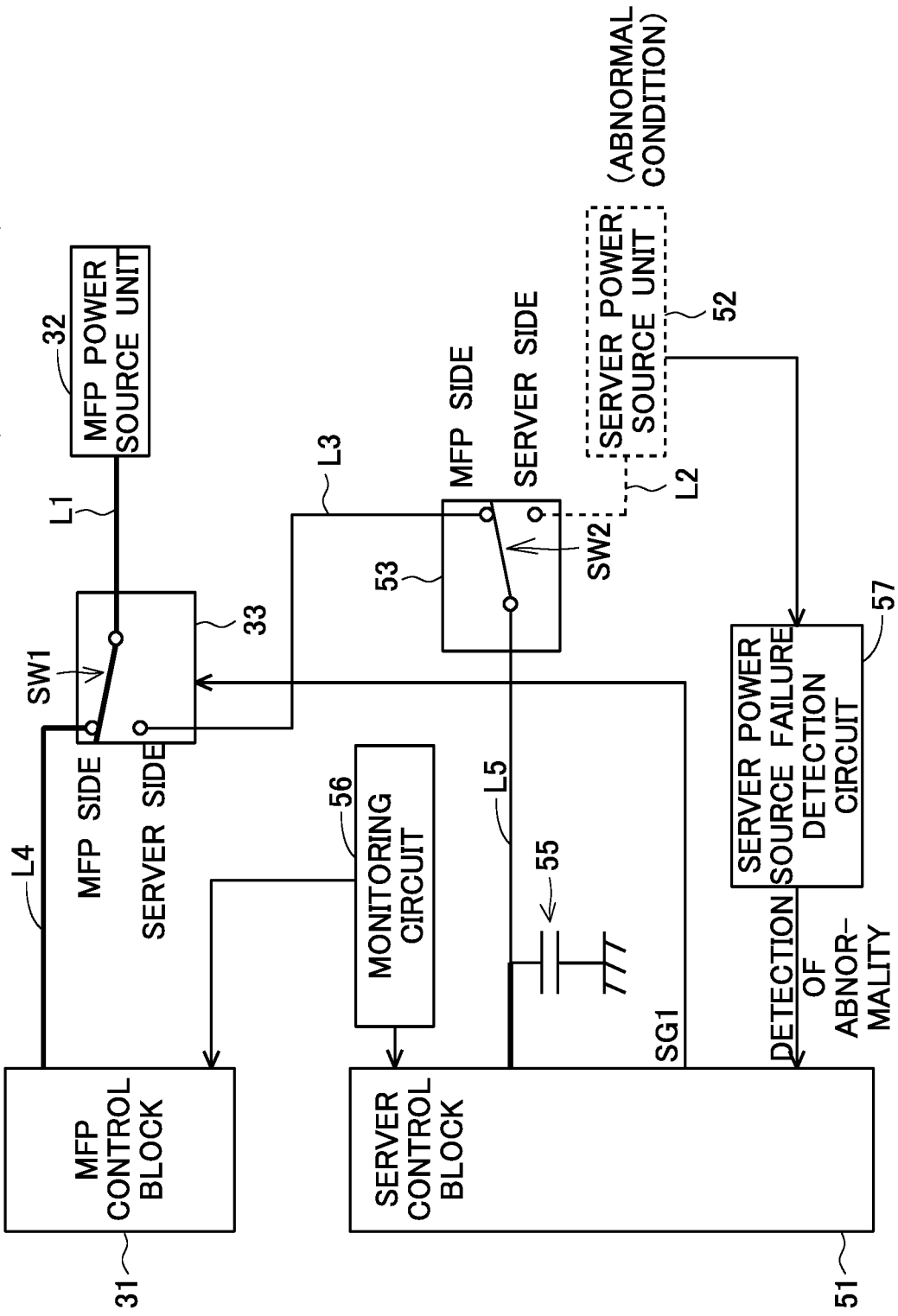

ND RECORDING MEDIUM

DATA PROCESSING APPARATUS, METHOD OF CONTROLLING DATA PROCESSING APPARATUS, AND RECORDING MEDIUM

Japanese Patent Application No. 2016-212849 filed on Oct. 31, 2016, including description, claims, drawings, and abstract the entire disclosure is incorporated herein by reference in its entirety.

BACKGROUND

Technological Field

The present invention relates to a data processing apparatus such as an MFP (Multi-Functional Peripheral) or the like, and its relevant technique.

Description of the Related Art

There is an MFP (data processing apparatus) having a print function, a scan function and/or the like.

In recent years, the MFP is required to serve as a server device in a network, and there is also an MFP provided with a server function.

Further, some of such MFPs are each provided with two power sources, i.e., an MFP power source which supplies electric power to an MFP functioning part (a processing part regarding an original function of MFP) and a server power source which supplies electric power to a server functioning part.

As to such MFPs, there is a possible case where one of these two power sources, which is a power source for a relatively important function, is duplexed. In order to avoid stopping a relatively important server function, for example, there is a possible case where the server power source is duplexed. Even when there occurs a failure or the like in the server power source, it is thereby possible to avoid stopping the server function.

Providing another server power source (second server power source), however, to duplex the server power source, besides the MFP power source and the original server power source, causes an increase in cost. Therefore, it is preferable to avoid providing another server power source (second server power source).

Further, Japanese Patent Application Laid Open Gazette No. 2008-228187 (Patent Document 1) discloses a technique to continue electric power supply by using a power source which is not used at that time. Even if the technique disclosed in Patent Document 1 is used, however, when there is no power source which is not used, it is difficult to continue electric power supply to a functioning part corresponding to the power source having a failure.

The above-described problem arises commonly in apparatuses including two power sources regarding two functions.

SUMMARY

It is an object of the present invention to provide a technique capable of avoiding stopping a function corresponding to one (server power source or the like) of two power sources regarding two functions and suppressing an increase in cost even when there occurs an abnormality in the one power source during use of the two power sources.

The present invention is intended for a data processing apparatus. According to a first aspect of the present invention, the data processing apparatus includes a first processor, a second processor, a first power source which performs electric power supply to the first processor, a second power source which preforms electric power supply to the second processor, a detector which detects an abnormality of the second power source, and a switcher which is capable of switching a power supply target of the first power source between the first processor and the second processor, and in the data processing apparatus of the present invention, when an abnormality of the second power source is detected, the first processor stops an operation of the first processor, and the switcher switches the power supply target of the first power source from the first processor to the second processor after the operation of the first processor is stopped.

The present invention is also intended for a method of controlling a data processing apparatus which comprises a first processor, a second processor, a first power source which performs electric power supply to the first processor, and a second power source which preforms electric power supply to the second processor. According to a second aspect of the present invention, the method performs a) detecting an abnormality of the second power source, b) stopping an operation of the first processor when an abnormality of the second power source is detected, and c) switching a power supply target of the first power source from the first processor to the second processor after the operation b).

The present invention is still also intended for a non-transitory computer-readable recording medium. According to a third aspect of the present invention, the non-transitory computer-readable recording medium records therein a computer program which causes a computer controlling the data processing apparatus, to execute the method as defined in the second aspect of the present invention.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a view showing a detailed configuration of a controller and the like;

FIG. 13 is a view showing exemplary received jobs;

FIG. 14 is a view in a tabular form showing detailed contents of a branch process;

FIG. 15 is a view showing a state in which the power supply target of the MFP power source is switched again after the occurrence of abnormality (a fourth preferred embodiment);

DETAILED DESCRIPTION OF EMBODIMENTS

Hereinafter, one or more embodiments of the present invention will be described with reference to the drawings. However, the scope of the invention is not limited to the disclosed embodiments.

1. The First Preferred Embodiment

<1-1. Constitution of Data Processing Apparatus>

Figure 1:
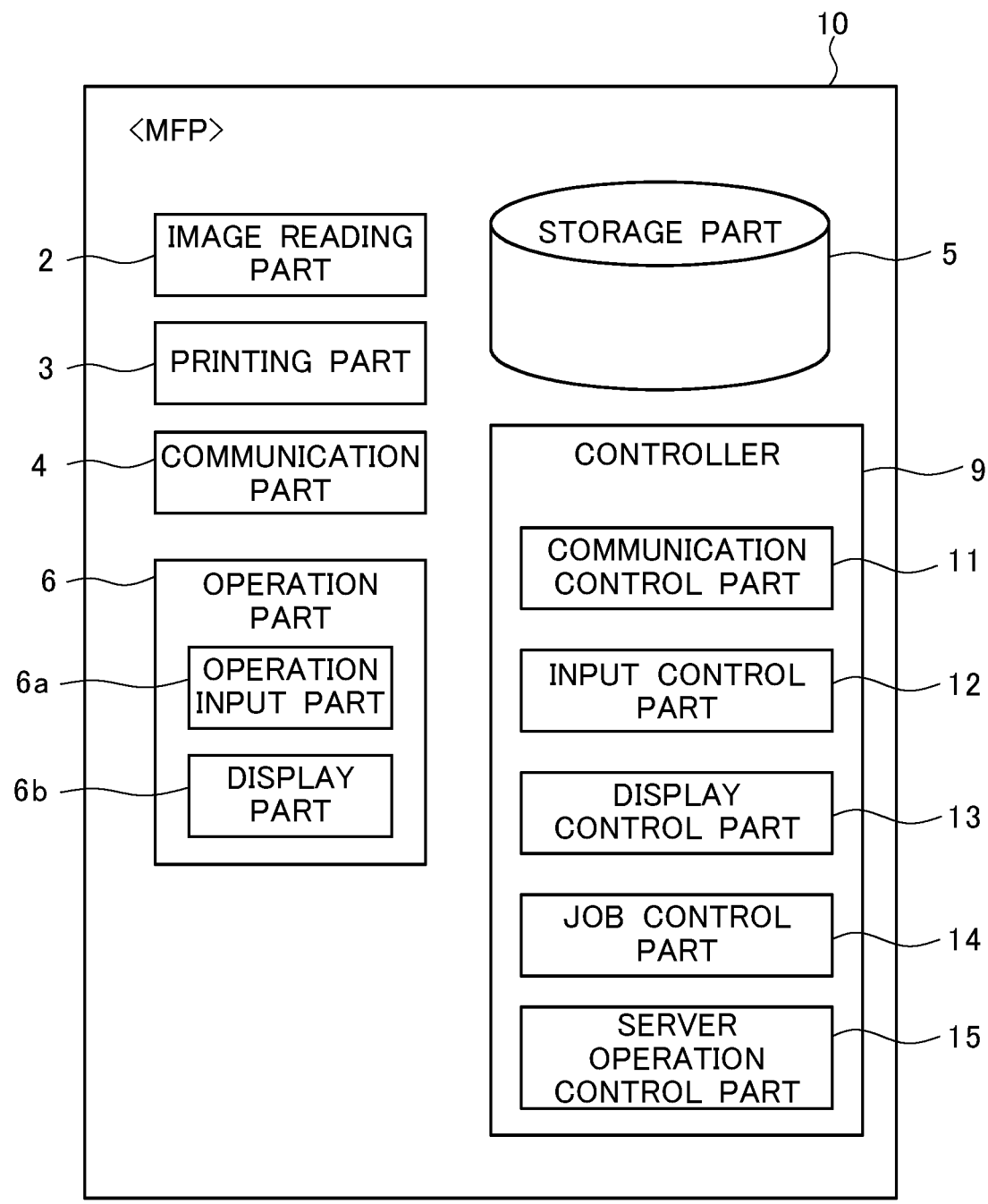
FIG. 1 is a view showing function blocks of an MFP (data processing apparatus)
Figure 2:
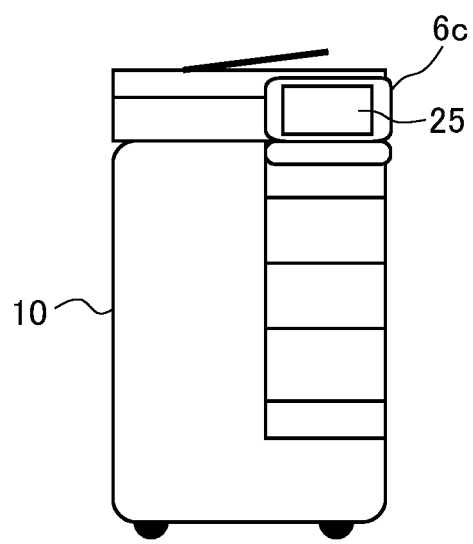
FIG. 2 is a view showing an appearance of the MFP.

FIG. 1 is a view showing function blocks of a data processing apparatus (in more detail, an MFP) 10. Herein, as the data processing apparatus, exemplarily shown is an MFP (Multi-Functional Peripheral) 10. Further, FIG. 2 is a view showing an appearance of the MFP 10.

The MFP 10 is an apparatus (also referred to as a multifunction machine) having a scanner function, a copy function, a facsimile function, a box storage function, and the like. Specifically, as shown in the functional block diagram of FIG. 1, the MFP 10 comprises an image reading part (image reader) 2, a printing part (printer) 3, a communication part 4, a storage part (storage) 5, an operation part 6, a controller 9, and the like, and multiply uses these constituent parts to implement various functions. The MFP 10 is also referred to as an image forming apparatus or an image processing apparatus.

The image reading part 2 is a processing part which optically reads (in other words, scans) an original manuscript placed on a predetermined position (ADF (Auto Document Feeder) or a glass surface (transparent document platen (original glass) or the like) of the MFP 10 and generates image data of the original manuscript (also referred to as an "original manuscript image" or a "scan image"). The image reading part 2 is also referred to as a scanning part (scanner).

The printing part 3 is an output part which prints out an image to various media such as paper on the basis of the data on an object to be printed.

The communication part 4 is a processing part capable of performing facsimile communication via public networks or the like. Further, the communication part 4 is capable of performing various network communications.

The storage part 5 is a nonvolatile storage device (also referred to as a nonvolatile storage) such as a hard disk drive (HDD) or/and the like.

The operation part 6 comprises an operation input part 6a which receives an operation input which is given to the MFP 10 and a display part (display) 6b which displays various information thereon.

The MFP 10 is provided with a substantially plate-like operation panel part (operation panel) 6c (see FIG. 2). The operation panel part 6c has a touch panel 25 (see FIG. 2) on a front surface side thereof. The touch panel 25 serves as part of the operation input part 6a and also serves as part of the display part 6b. The touch panel 25 is a liquid crystal display panel in which various sensors or the like are embedded, and capable of displaying various information thereon and receiving various operation inputs from an operating user (manipulating user).

The controller (control part) 9 (see FIG. 1) is a control unit which generally controls the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a program) stored in a boot memory (flash memory or the like), to thereby implement various processing parts. Further, the program (in more detail, a group of program modules) may be recorded in one of various portable recording media (in other words, various non-transitory computer-readable recording media), such as a USB memory and the like, and read out from the recording medium to be installed in the MFP 10. Alternatively, the program may be downloaded via a network to be installed in the MFP 10.

Specifically, as shown in FIG. 1, the controller 9 executes the above-described program, to thereby implement various processing parts including a communication control part (communication controller) 11, an input control part (input controller) 12, a display control part (display controller) 13, a job control part (job controller) 14, and a server operation control part (server operation controller) 15.

The communication control part 11 is a processing part which controls a communication operation with other apparatus(es) in cooperation with the communication part 4 and the like. The communication control part 11 has a transmission control part (transmission controller) which controls a transmission operation of various data and a reception control part (reception controller) which controls a reception operation of various data.

The input control part 12 is a control part which controls an operation inputting operation to the operation input part 6a (the touch panel 25 or the like). For example, the input control part 12 controls an operation for receiving an operation input to an operation screen displayed on the touch panel 25.

The display control part 13 is a processing part which controls a display operation on the display part 6b (the touch panel 25 or the like).

The job control part 14 is a processing part which controls operations regarding various jobs (print-out operation, image reading operation, and the like).

The server operation control part 15 is a processing part which controls a server operation (described later) of the MFP 10.

<1-2. Detailed Constitution of Controller, Etc.>

Figure 3:
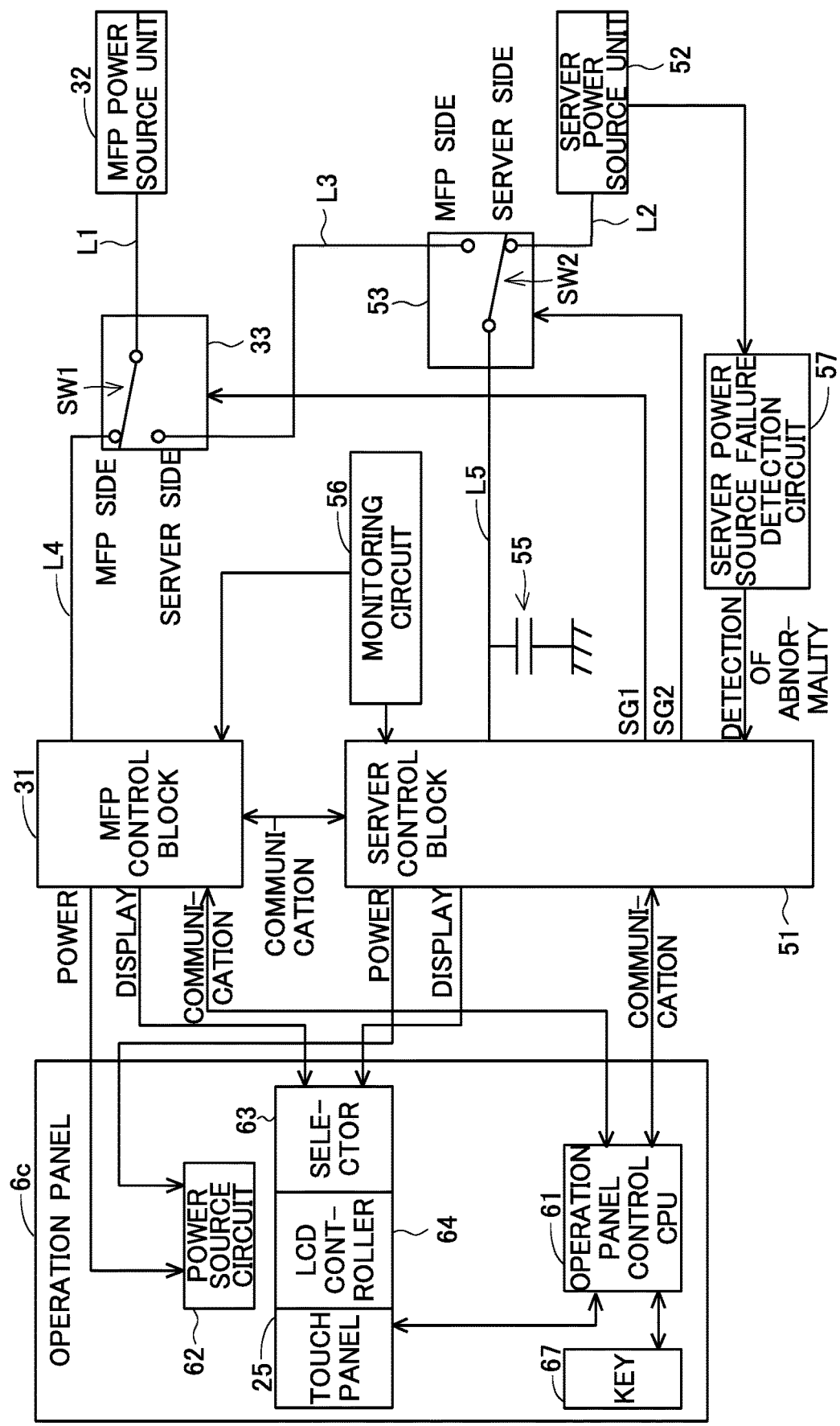

FIG. 3 is a view showing a detailed configuration of the controller 9 and the like.

As shown in FIG. 3, the MFP 10 comprises an MFP control block (also referred to as an MFP control unit) 31 and a server control block (also referred to as a server control unit) 51. The MFP control block 31 and the server control block 51 are included in the controller 9 as different units. The MFP control block 31 and the server control block 51 each has a CPU and the like, and the respective CPUs execute corresponding programs, to thereby implement various operations.

The MFP control block 31 is a control unit which controls an operation (a copy operation, a scan operation, a print operation, and/or the like accompanied by an image processing) (also referred to as an MFP operation) of the MFP (also referred to as a multifunction machine) 10 as an image processing apparatus. The MFP control block 31 is also referred to as a processing part (simply as an MFP processing part) to implement an image processing function of the MFP 10, or the like. The CPU of the MFP control block 31 executes a corresponding program, and the MFP control block 31 thereby operates as the job control part 14 and/or the like.

The server control block 51 is a control unit which controls an operation (an operation to implement a server function such as a file server function, a web server function, or the like) (also referred to as a server operation) of the MFP 10 as a server. The server control block 51 is also referred to as a processing part (simply as a server processing part) to implement the server function of the MFP 10, or the like. The CPU of the server control block 51 executes a corresponding program, and the server control block 51 thereby operates as the server operation control part 15 and/or the like.

The MFP 10 further comprises an MFP power source 32, a power source switching circuit 33, a server power source 52, a power source switching circuit 53, a power storage 55, a monitoring circuit 56, and a server power source failure detection circuit 57.

The MFP power source 32 is a power source which performs electric power supply to the MFP control block 31 in a normal condition. The MFP power source 32 is also referred to as an MFP power source unit.

The server power source 52 is a power source which performs electric power supply to the server control block 51 in a normal condition. The server power source 52 is also referred to as an server power source unit.

The power source switching circuit (also referred to as a first power source switching circuit) 33 (SW1) is a circuit which switches a power supply target of the MFP power source 32. The first power source switching circuit 33 selectively connects a power supply line L1 from the MFP power source 32 to one of an MFP-side terminal and a server-side terminal in the first power source switching circuit 33. In more detail, a switching operation is performed between a power supply line L4 connected to the MFP-side terminal in the first power source switching circuit 33 and a power supply line L3 connected to the server-side terminal in the first power source switching circuit 33. Further, a switching operation is performed between electric power supply using the power supply lines L1 and L4 (electric power supply to the side of the MFP control block 31) and electric power supply using the power supply lines L1, L3, and the like (electric power supply to the side of the server control block 51).

The power source switching circuit (also referred to as a second power source switching circuit) 53 (SW2) is a circuit which switches a power supply source for the server control block 51. The second power source switching circuit 53 selectively connects a power supply line L5 for the server control block 51 to one of an MFP-side terminal and a server-side terminal in the second power source switching circuit 53. In more detail, a switching operation is performed between the power supply line L3 connected to the MFP-side terminal in the second power source switching circuit 53 and a power supply line L2 connected to the server-side terminal in the second power source switching circuit 53. Further, a switching operation is performed between electric power supply using the power supply lines L2 and L5 (electric power supply from the server power source 52) and electric power supply using the power supply lines L3, L5, and the like (electric power supply from the MFP power source 32).

By using the first power source switching circuit 33 and the second power source switching circuit 53, it is possible to switch the power supply target of the MFP power source 32 between the MFP control block 31 and the server control block 51. Particularly, it is possible to switch the power supply target of the MFP power source 32 between in a state of normal operation and in a state where an abnormality is detected in the server power source 52.

Figure 4:
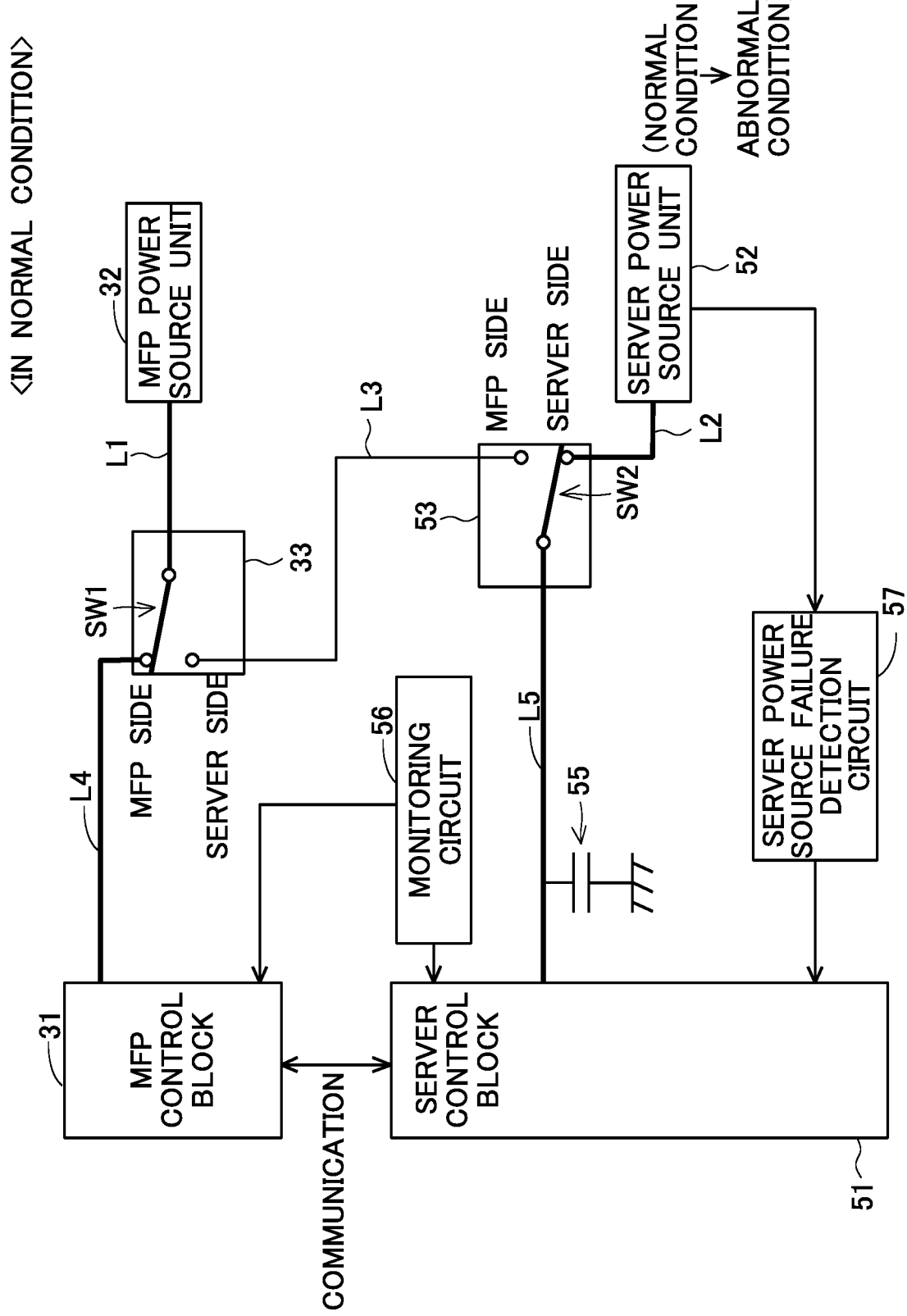
FIG. 4 is a view showing a state of normal operation.

In the state of normal operation, for example, as shown in FIG. 4, a connection target of the power supply line L1 is switched to the MFP-side terminal by the first power source switching circuit 33 (SW1) and a connection target of the power supply line L5 is switched to the server-side terminal by the second power source switching circuit 53 (SW2). In this case, the power supply line L1 is connected to the power supply line L4 which is connected to the MFP-side terminal, and electric power from the MFP power source 32 is supplied to the MFP control block 31 through the power supply lines L1 and L4. Further, the power supply line L5 is connected to the power supply line L2 which is connected to the server-side terminal. As a result, electric power from the server power source 52 (power supply source) is supplied to the server control block 51 through the power supply lines L2 and L5.

Figure 6:
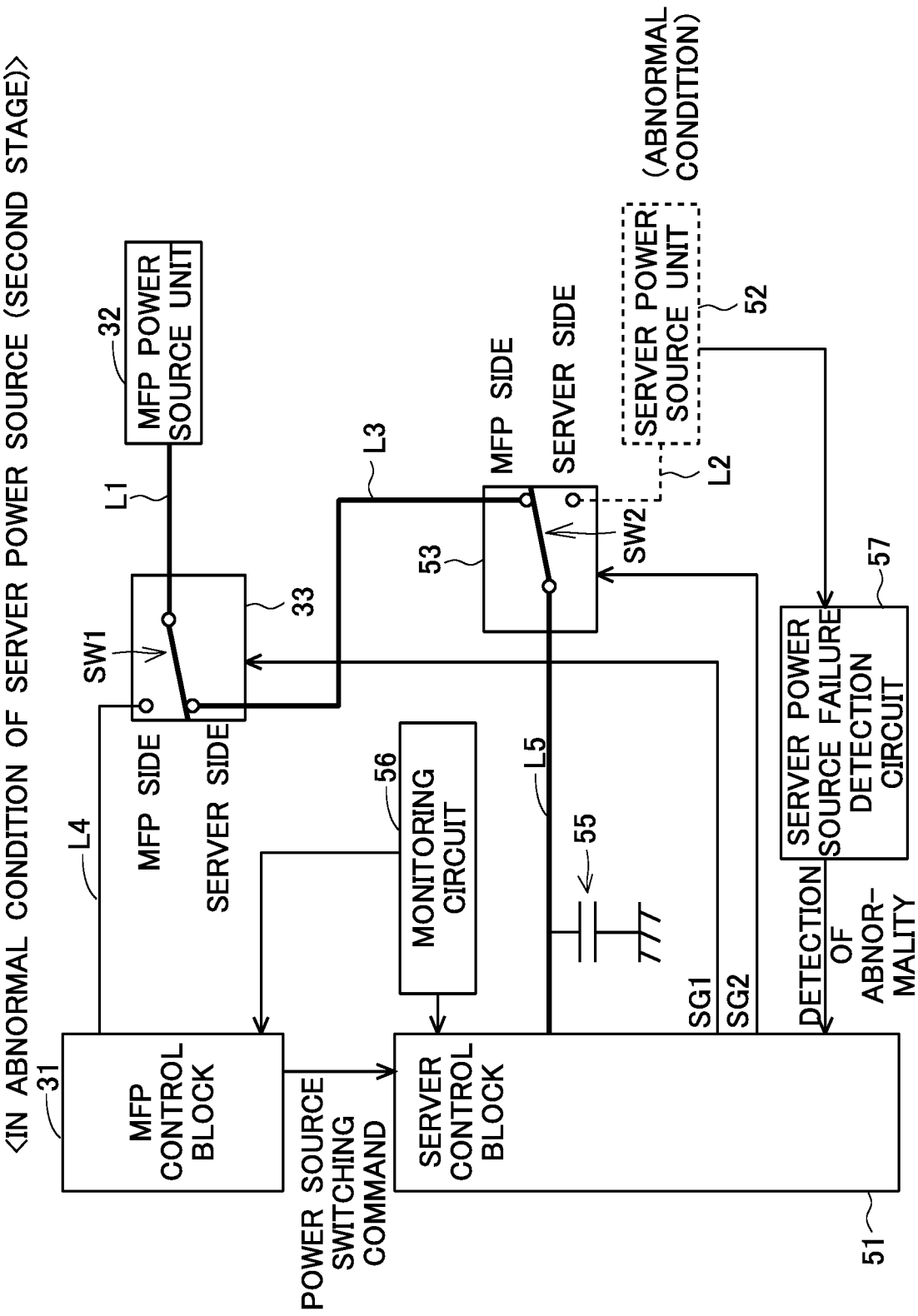
FIG. 6 is a view showing a state in which a power supply target of the MFP power source is switched after the occurrence of abnormality.

Further, as described later, when an abnormality of the server power source 52 is detected, after some time elapses, as shown in FIG. 6, the connection target of the power supply line L1 is switched to the server-side terminal by the first power source switching circuit 33 (SW1) and the connection target of the power supply line L5 is switched to the MFP-side terminal by the second power source switching circuit 53 (SW2). In this case, the power supply line L1 is connected to the power supply line L3 which is connected to the server-side terminal in the first power source switching circuit 33, and the power supply line L5 is connected to the power supply line L3 which is connected to the MFP-side terminal in the second power source switching circuit 53. As a result, the electric power from the MFP power source 32 is supplied to the server control block 51 through the power supply lines L1, L3, and L5.

The power storage 55 is a capacitor (or a secondary battery) of high capacity and/or the like. The power storage 55 is charged with electric power from the power supply line L5.

In a normal condition, as shown in FIG. 4, electric power is supplied from the server power source 52 to the server control block 51 through the power supply lines L2 and L5, and the power storage 55 is charged with the electric power supplied from the server power source 52 through the power supply lines L2 and L5.

Further, as described later, in an abnormal condition (see FIG. 6), electric power is supplied from the MFP power source 32 to the server control block 51 through the power supply lines L1, L3, and L5, and the power storage 55 is charged with the electric power supplied from the MFP power source 32 through the power supply lines L1, L3, and L5.

The monitoring circuit 56 is a circuit which monitors a state of charge of the power storage 55. The monitoring circuit 56 detects a charge level of the power storage 55, and notifies the MFP control block 31 and/or the server control block 51 of a detection result of the charge level.

The server power source failure detection circuit 57 is capable of detecting an abnormality (failure or the like) of the server power source 52. When the server power source failure detection circuit 57 detects an abnormality of the server power source 52, the server power source failure detection circuit 57 notifies the server control block 51 of the occurrence of abnormality.

Further, the MFP control block 31 and the server control block 51 are each capable of supplying electric power to the operation panel part 6c (see FIG. 3). In more detail, the electric power is supplied to various components of the operation panel part 6c through a power source circuit 62 in the operation panel part 6c. The electric power is supplied to the operation panel part 6c from either the MFP control block 31 or the server control block 51 as appropriate.

Furthermore, the MFP control block 31 and the server control block 51 are each also capable of performing communication with the operation panel part 6c (in detail, a CPU 61 for operation panel control, or the like, in the operation panel part 6c).

For example, transmission and reception of input information or the like obtained by using keys 67, the touch panel 25, and the like of the operation panel part 6c are performed between the CPU 61 and the MFP control block 31 and between the CPU 61 and the server control block 51 as appropriate.

Further, a display content on the touch panel 25 in the operation panel part 6c is controlled on the basis of also information from the MFP control block 31 and the server control block 51. More specifically, the display content of the touch panel 25 is controlled through the CPU 61, a selector 63, an LCD controller 64, and the like in the operation panel part 6c.

<1-3. Operation>

FIG. 4 is a view showing connections and the like in the state of normal operation of the MFP 10.

In the state of normal operation (normal condition), with the connections shown in FIG. 4, the electric power from the MFP power source 32 is supplied to the MFP control block 31 through the power supply lines L1 and L4, and the electric power from the server power source 52 is supplied to the server control block 51 through the power supply lines L2 and L5.

Figure 5:
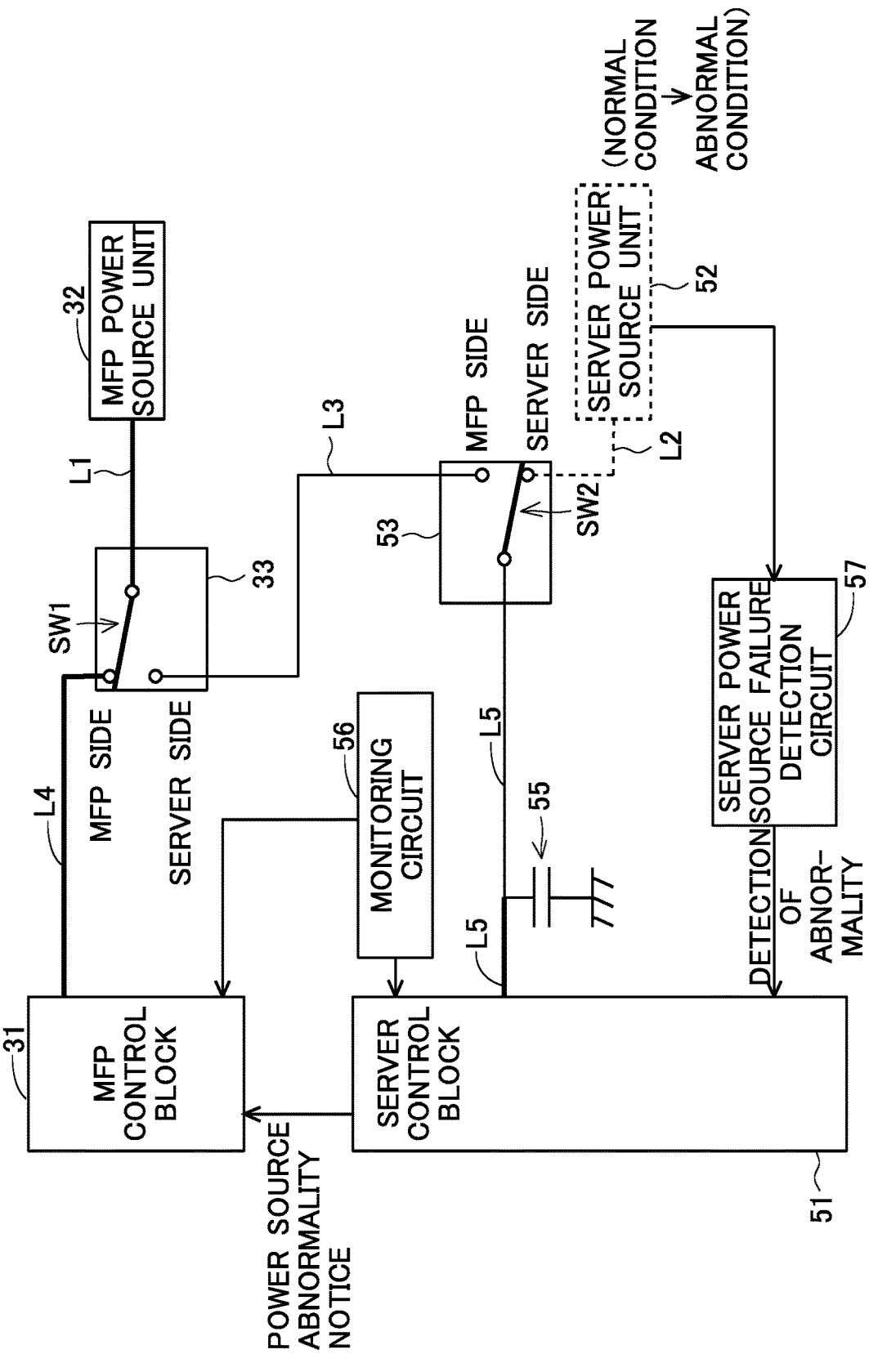
FIG. 5 is a view showing a state immediately after an abnormality occurs in a server power source.

Then, when the server power source failure detection circuit 57 detects an abnormality of the server power source 52, after the operation of the MFP control block 31 continues for a while (a required operation is performed), the operation of the MFP control block 31 is stopped. Further, for a while after the abnormality of the server power source 52 is detected, as shown in FIG. 5, the electric power stored in the power storage 55 in a period of normal operation of the server power source 52 is supplied from the power storage 55 to the server control block 51 and the operation of the server control block 51 thereby continues, and the operation of the MFP control block 31 continues by the electric power supply from the MFP power source 32.

After that, the power supply target of the MFP power source 32 is switched from the MFP control block 31 to the server control block 51 (see FIG. 6). After the switching, the server control block 51 operates by the electric power supplied from the MFP power source 32 (instead of the server power source 52 or the power storage 55).

Figure 7:
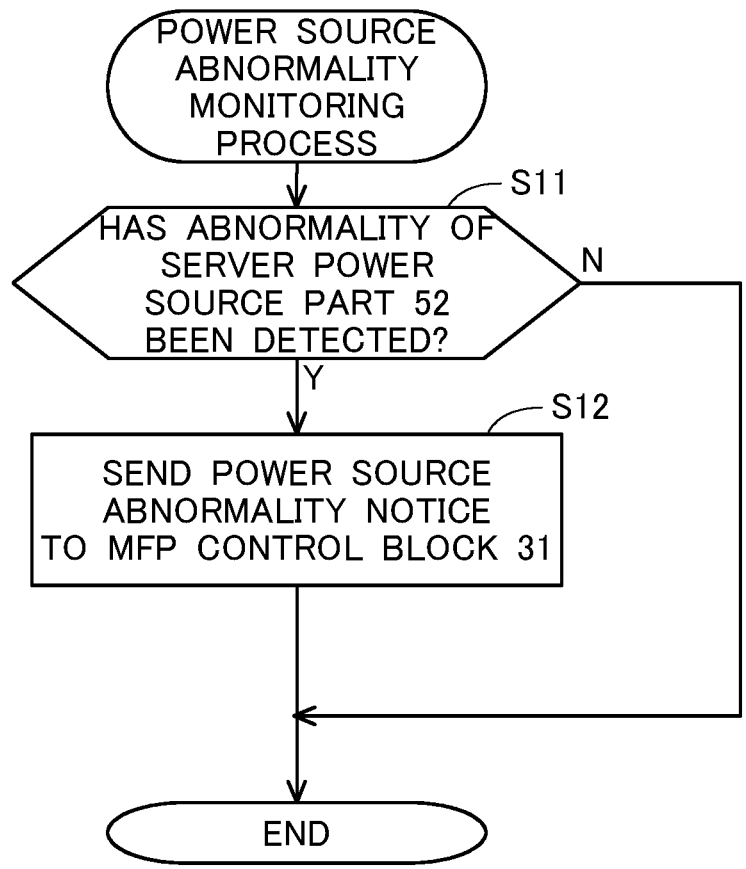
FIGS. 7 and 8 are flowcharts each showing an operation of a server control block.
Figure 8:
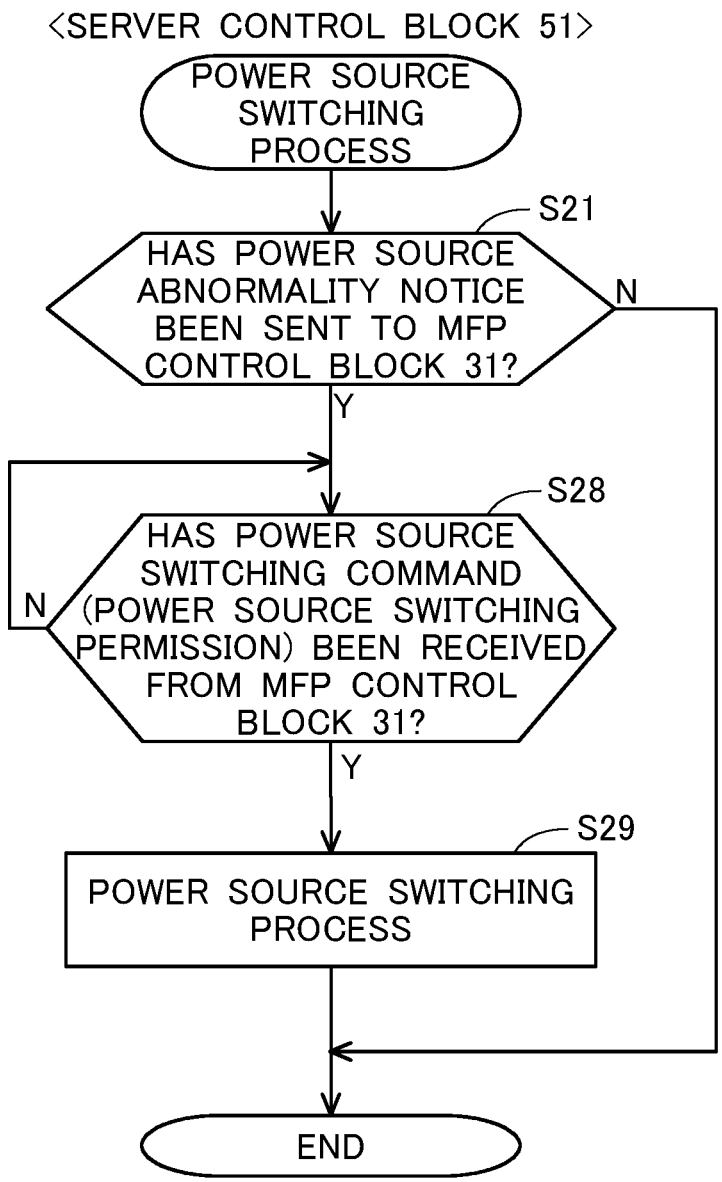

Hereinafter, such an operation will be described in detail with reference to FIGS. 7 to 9. FIGS. 7 and 8 are flowcharts each showing the operation of the server control block 51 (server processing part), and FIG. 9 is a flowchart showing the operation of the MFP control block 31 (MFP processing part).

With the connections shown in FIG. 4, when the abnormality of the server power source 52 is detected by the server power source failure detection circuit 57 and an abnormality detection signal from the server power source failure detection circuit 57 is detected by the server control block 51 (see Step S11 of FIG. 7), the process goes to Step S12.

In Step S12, the server control block 51 sends a notice (power source abnormality notice) indicating that an abnormality occurs in the server power source 52 to the MFP control block 31 (also see FIG. 5).

Figure 9:
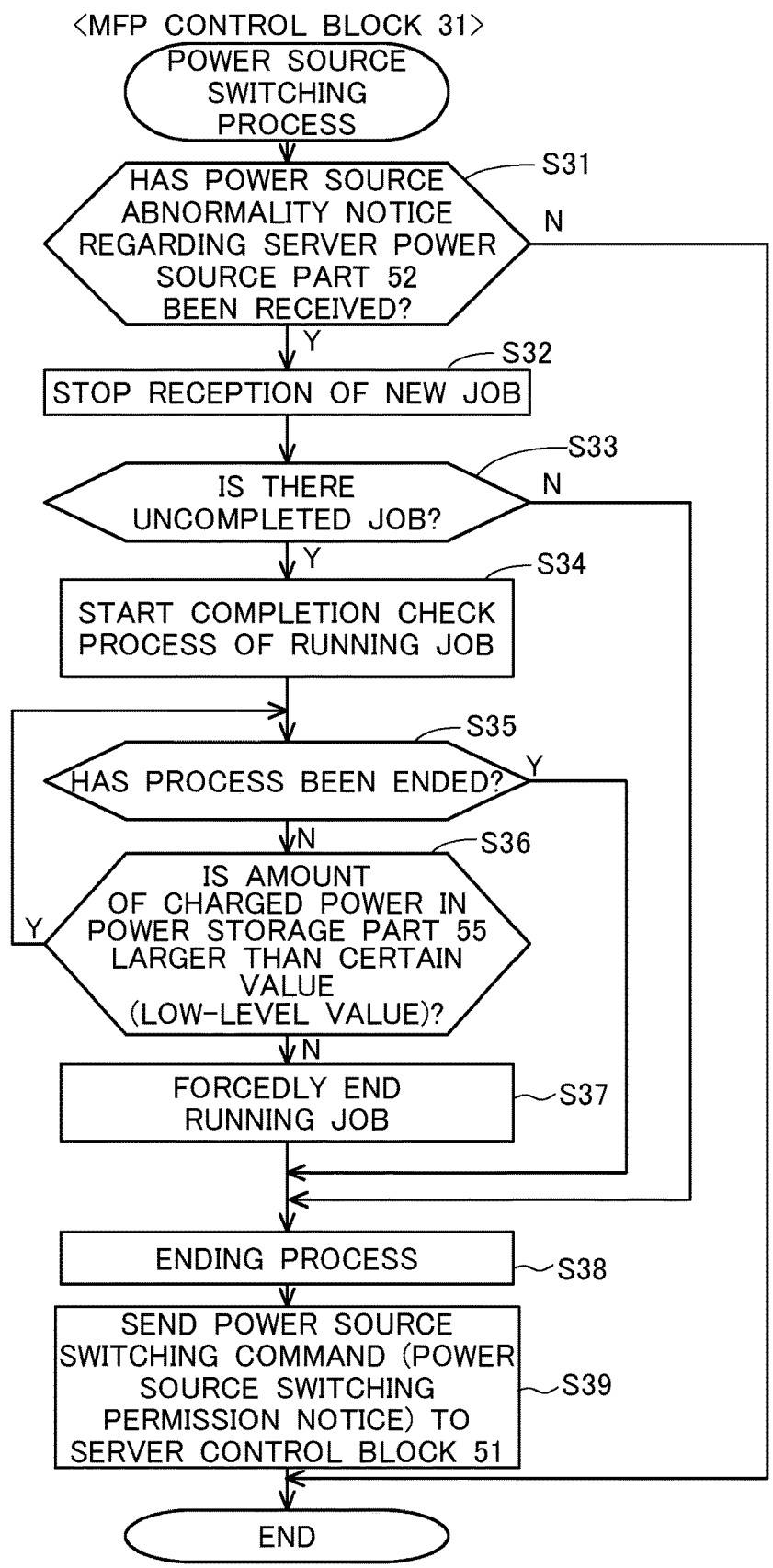
FIG. 9 is a flowchart showing an operation of an MFP control block.

When the power source abnormality notice is received by the MFP control block 31, the process goes from Step S31 to Step S32 in the flowchart of FIG. 9.

In Step S32, reception of a new job is stopped.

In Step S33, it is determined whether or not there is a received (and uncompleted) job.

When there is no received job, the process immediately goes to Steps S38 and S39. The processes of Steps S38 and 39 will be described later.

When there is a received job, a completion check process of the received (and running) job is started (Step S34). When it is determined in Step S35 that the received job is completed (finished), the process goes to Step S38. On the other hand, when it is determined in Step S35 that the received job is not completed, the process goes to Step S36. While it is determined that the amount of charged power in the power storage 55 is still a certain level or more (not lower than a low-level threshold value) (a certain amount of electric power or more remains), the process goes back to Step S35 and execution of the received job continues. Conversely, when it is determined in Step S36 that the amount of charged power in the power storage 55 is reduced to lower than a certain level, the job is forcedly ended (Step S37). At that time, when printing paper remains on a printing paper conveyance path, for example, an operation of ejecting the printing paper, and the like, is performed.

After the job is ended thus (normally ended or forcedly ended), the process goes to Step S38.

Next, in Step S38, an ending process of the MFP control block 31 (for example, a process of saving various data (counter data or the like) stored in the RAM into the nonvolatile storage, and the like) is performed. When the ending process of the MFP control block 31 is completed, the operation of the MFP control block 31 is stopped and the process goes to Step S39.

In Step S39, a power source switching command (also referred to as a power source switching permission notice) is sent from the MFP control block 31 to the server control block 51.

As shown in FIG. 8, when the server control block 51 receives the power source switching command from the MFP control block 31, the process goes from Step S28 to Step S29. In more detail, when it is determined (in Step S28) that the power source abnormality notice (see Step S12) has been already sent from the server control block 51 to the MFP control block 31 (Step S21) and the power source switching command (see Step S39) from the MFP control block 31 is received, the process of the server control block 51 goes to Step S29.

In Step S29, the server control block 51 performs a power source switching process on the basis of the power source switching command (power source switching permission notice) from the MFP control block 31.

Specifically, the server control block 51 sends a switching signal SG1 to the first power source switching circuit 33 and thereby changes the connection in the first power source switching circuit 33 (SW1) to such connection as shown in FIG. 6. Specifically, switching to the server-side terminal in the first power source switching circuit 33 (SW1) is performed. In other words, switching is performed from a state in which the power supply line L4 is connected to the power supply line L1 to another state in which the power supply line L3 is connected to the power supply line L1.

Further, the server control block 51 sends a switching signal SG2 to the second power source switching circuit 53 and thereby changes the connection in the second power source switching circuit 53 (SW2) to such connection as shown in FIG. 6. Specifically, switching to the MFP-side terminal in the second power source switching circuit 53 (SW2) is performed. In other words, switching is performed from a state in which the power supply line L2 is connected to the power supply line L5 to another state in which the power supply line L3 is connected to the power supply line L5.

By performing the switching processes in accordance with the switching signals SG1 and SG2, the electric power from the MFP power source 32 is supplied to the server control block 51 through the power supply lines L1, L3, and L5. Further, the electric power supply from the MFP power source 32 to the MFP control block 31 is stopped (cut off). Thus, the state is changed to a state in which the server control block 51 operates while receiving the electric power supply from the MFP power source 32.

With the above-described operation, when an abnormality of the server power source 52 is detected, the operation of the MFP control block 31 is stopped, and after stopping the operation of the MFP control block 31, the power supply target of the MFP power source 32 is switched from the MFP control block 31 to the server control block 51 (see FIG. 6).

Therefore, even when an abnormality of the server power source 52 is detected, it is possible to avoid stopping the function (server function) corresponding to the server power source 52. Particularly, even when all the plurality of power sources 32 and 52 regarding the plurality of functions are used and an abnormality occurs in the server power source 52 among the plurality of power sources 32 and 52, it is possible to avoid stopping the function (server function) corresponding to the server power source 52. In more detail, it is possible to avoid stopping the operation of the server control block 51 on which continuing the operation is relatively important, among the MFP control block 31 and the server control block 51. Further, since the already-existing MFP power source 32 is used to respond to the occurrence of abnormality in the server power source 52, it is possible to ensure reduction in cost, as compared with the case where another server power source is further provided besides the server power source 52.

Further, in the above-described first preferred embodiment, when an abnormality of the server power source 52 is detected, after the operation of the server control block 51 continues for a while by the electric power supply from the power storage 55 and the operation of the MFP control block 31 continues for a while by the electric power supply from the MFP power source 32, the operation of the MFP control block 31 is stopped. Particularly, after an abnormality occurs in the server power source 52, since the electric power stored in the power storage 55 until the point in time when the abnormality occurs is supplied to the server control block 51 (see FIG. 5), the server control block 51 can continue the operation thereof even without immediately switching the power supply target of the MFP power source 32 to the server control block 51. In other words, a certain degree of extension period (delay period) can be afforded in the switching of electric power supply. In this extension period, it is possible to continue the operation of the server control block 51 on the basis of the electric power supply from the power storage 55 while continuing the operation of the MFP control block 31 on the basis of the electric power supply from the MFP power source 32.

Furthermore, though the exemplary case where a single job is present has been mainly described in the above-described first preferred embodiment, the present invention is not limited to this case, and the above-described idea may be applied also to a case where a plurality of jobs are present. In such a case, at a point in time when the plurality of jobs are executed in serial and the amount of power remaining in the power storage 55 becomes lower than a certain degree (the above-described low-level threshold value), the operation of the MFP control block 31 may be ended by forcedly ending the job in execution and stopping the remaining job, and so on. After that, the power supply target of the MFP power source 32 may be switched from the MFP control block 31 to the server control block 51.

2. The Second Preferred Embodiment

The second preferred embodiment is a variation of the first preferred embodiment. Hereinafter, description will be made, centering on the difference between the first and second preferred embodiments.

In the second preferred embodiment, when an abnormality of the server power source 52 is detected, a job in execution (also referred to as a running job) at the point in time when the abnormality is detected is continuously executed on the condition that the running job can be completed by a point in time when a predetermined time T0 elapses from the point in time when the abnormality is detected. Then, after the running job is completed, the operation of the MFP control block 31 is stopped and further after that, the power supply target of the MFP power source 32 is switched from the MFP control block 31 to the server control block 51.

Herein, the predetermined time T0 is a determined as a period while the server control block 51 can operate by using the electric power stored in the power storage 55 during the normal operation of the server power source 52, even after the occurrence of abnormality of the server power source 52. In more detail, the predetermined time T0 is a time calculated on the basis of the state of charge (the state of charge of the power storage 55) detected by the monitoring circuit 56.

In the second preferred embodiment, particularly, the predetermined time T0 is explicitly determined, and before the determined predetermined time T0 elapses, the operation of the MFP control block 31 is stopped. Also in the first preferred embodiment, the operation of the MFP control block 31 is consequently stopped before the predetermined time T0 elapses. In the first preferred embodiment, however, the predetermined time T0 is not explicitly determined. On the other hand, in the second preferred embodiment, the predetermined time T0 is explicitly determined, and it is determined in advance whether or not a time T20 until the running job is completed is shorter than the predetermined time T0 (the running job can be completed within the predetermined time T0) and on the condition that the above condition is satisfied, the running job is continued and completed. The second preferred embodiment is different in this point from the first preferred embodiment.

Further, also in the second preferred embodiment, when the abnormality of the server power source 52 is detected, the operation of the server control block 51 continues for a while by the electric power supply from the power storage 55 (see FIG. 5). In more detail, in the second preferred embodiment, in a certain period within the predetermined time (predetermined period) T0 after the abnormality of the server power source 52 is detected, the operation of the server control block 51 continues for a while by the electric power supply from the power storage 55.

Furthermore, in the second preferred embodiment, it is assumed that a plurality of jobs have been received (and unprocessed) in the MFP control block 31 when the abnormality of the server power source 52 is detected.

In the second preferred embodiment, the MFP control block 31 stops (does not start) execution of some (also referred to as unstarted jobs) of the plurality of jobs, which have not been started. The stopped jobs are saved into the nonvolatile storage (HDD, SDD, and/or the like).

Further, when it is determined that the job in execution (running job) among the plurality of jobs can be completed within the predetermined time T0, the MFP control block 31 continues the execution of the running job. On the other hand, when it is determined that the job in execution cannot be completed within the predetermined time T0, the MFP control block 31 suspends the job in execution. The suspended job is saved into the nonvolatile storage (HDD, SDD, and/or the like).

After that, like in the first preferred embodiment, the power supply target of the MFP power source 32 is switched from the MFP control block 31 to the server control block 51. After the switching (see FIG. 6), the server control block 51 operates by the electric power supplied from the MFP power source 32 (not the server power source 52 nor the power storage 55).

Figure 10:
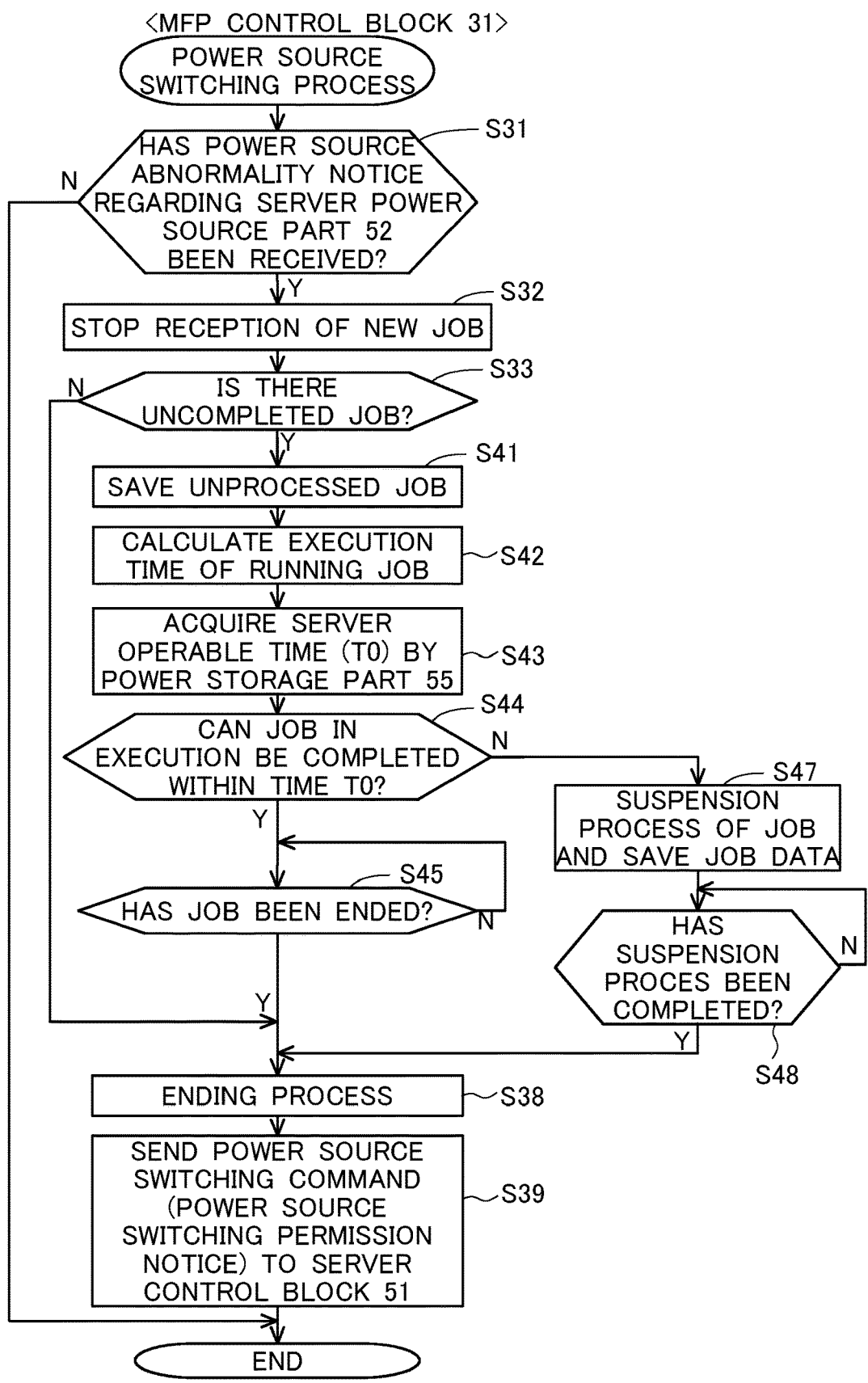
FIG. 10 is a flowchart showing an operation of the MFP control block in accordance with a second preferred embodiment.

Hereinafter, such an operation will be described in detail with reference to FIG. 10 and the like. FIG. 10 is a flowchart showing an operation of the MFP control block 31 in accordance with the second preferred embodiment.

Steps S31 and S32 are the same as those in the first preferred embodiment, and in the next step S33, it is determined whether or not there is an uncompleted job (in detail, a received and uncompleted job).

When there is no uncompleted job, the process immediately goes to Steps S38 and S39, and when there is an uncompleted job, the process goes to Step S41.

In Step S41, the MFP control block 31 stops execution of some (also referred to as unstarted jobs or unprocessed jobs) of the uncompleted jobs, which have been started, and saves the unstarted jobs into the nonvolatile storage (HDD, SDD, and/or the like).

Next, in Step S42, the MFP control block 31 calculates a remaining time of the execution time (remaining execution time) T20 of the running job. In other words, a time (expected period) T20 required to complete the running job is calculated.

Further, in Step S43, the MFP control block 31 calculates the above-described predetermined time T0 (in short, an operable time (period) of the server control block 51 by the electric power stored in the power storage 55) on the basis of the state of charge of the power storage 55 (the state of charge detected by the monitoring circuit 56) or the like. When the current charge level is relatively high (for example, 100%), the time T0 is calculated as a relatively large value. Conversely, when the current charge level is relatively low (for example, 80%), the time T0 is calculated as a relatively small value.

In Step S44, performed is a branch process based on a length relation (which is longer) between the remaining execution time T20 and the time T0.

When it is determined that the remaining execution time T20 is shorter than the time T0 (in other words, the running job can be completed within the time T0), the running job is continued. As shown in FIG. 5, the running job is executed by the MFP control block 31 using the electric power supplied from the MFP power source 32. When it is determined in Step S45 that the execution of the running job is completed, the process goes to Step S38.

On the other hand, when it is determined that the remaining execution time T20 is longer than the time T0 (in other words, the running job cannot be completed within the time T0), the process goes to Step S47. In Step S47, the running job is suspended and the suspended running job (in detail, job data thereof and the like) is saved into the nonvolatile storage. When it is determined in Step S48 that the suspension process and a saving process of the running job are completed, the process goes to Step S38.

After that, like in the first preferred embodiment, the operation of Step S38 and the following operations are performed. Further, the operation of the server control block 51 in the processing period of Steps S31 to S39 (at most predetermined time T0) is performed by using the electric power stored in the power storage 55 until then (see FIG. 5).

Further, after that, the server control block 51 performs the power source switching process (Step S29 (FIG. 8)) on the basis of the power source switching command from the MFP control block 31 in Step S39 (also see FIG. 6). The electric power from the MFP power source 32 is thereby supplied to the server control block 51 through the power supply lines L1, L3, and L5.

With the above-described operation, the same effects as those in the first preferred embodiment are produced.

Specifically, when an abnormality of the server power source 52 is detected, before (at most) the predetermined time T0 elapses, the operation of the MFP control block 31 is stopped and the power supply target of the MFP power source 32 is switched from the MFP control block 31 to the server control block 51 (see FIG. 6). In more detail, after the running job (which is determined to be able to be completed within the predetermined time T0) is actually completed, the operation of the MFP control block 31 is stopped and the power supply target of the MFP power source 32 is switched from the MFP control block 31 to the server control block 51.

Therefore, even when an abnormality of the server power source 52 is detected, it is possible to avoid stopping the function (server function) corresponding to the server power source 52. Particularly, even when all the plurality of power sources 32 and 52 regarding the plurality of functions are used and an abnormality occurs in the server power source 52 among the plurality of power sources 32 and 52, it is possible to avoid stopping the function (server function) corresponding to the server power source 52. In more detail, it is possible to avoid stopping the operation of the server control block 51 on which continuing the operation is relatively important, among the MFP control block 31 and the server control block 51. Further, since the already-existing MFP power source 32 is used to respond to the occurrence of abnormality in the server power source 52, it is possible to ensure reduction in cost, as compared with the case where another server power source is further provided besides the server power source 52.

Further, after an abnormality occurs in the server power source 52, since the electric power stored in the power storage 55 is supplied to the server control block 51, a certain degree of extension period can be afforded in the switching of power supply source.

Particularly in the second preferred embodiment, in this extension period, only the running job which can be completed within the predetermined time T0 is selected (determined) in advance among the jobs which have been already received by the MFP control block 31, and execution of the selected job continues. Therefore, it is possible to continue as many running jobs as possible and reliably complete the running jobs.

3. The Third Preferred Embodiment

The third preferred embodiment is a variation of the second preferred embodiment. In the third preferred embodiment, performed is such a control as to perform as many jobs as possible among a plurality of received jobs (uncompleted jobs) within the predetermined time T0.

In the third preferred embodiment, specifically, in a case where there are a plurality of jobs which have not been completed in the MFP control block 31 in the occurrence of abnormality of the server power source 52, when it is determined that a period (expected period) T30 until all the plurality of jobs are completed is shorter than the predetermined time T0, all the plurality of jobs are executed and completed. Then, after the plurality of jobs are completed, the switching of the power supply target of the MFP power source 32 is performed.

Further, in the same case, when it is determined that the period (expected period) T30 until all the plurality of jobs are completed exceeds the predetermined time T0, executions of only some of the plurality of jobs, which can be completed within the predetermined time T0, are continued or started and completed, and executions of the remaining jobs are suspended or stopped. At that time, the running jobs among the plurality of jobs are first preferentially executed. Further, jobs which require a relatively short time are next preferentially executed.

Figure 11:
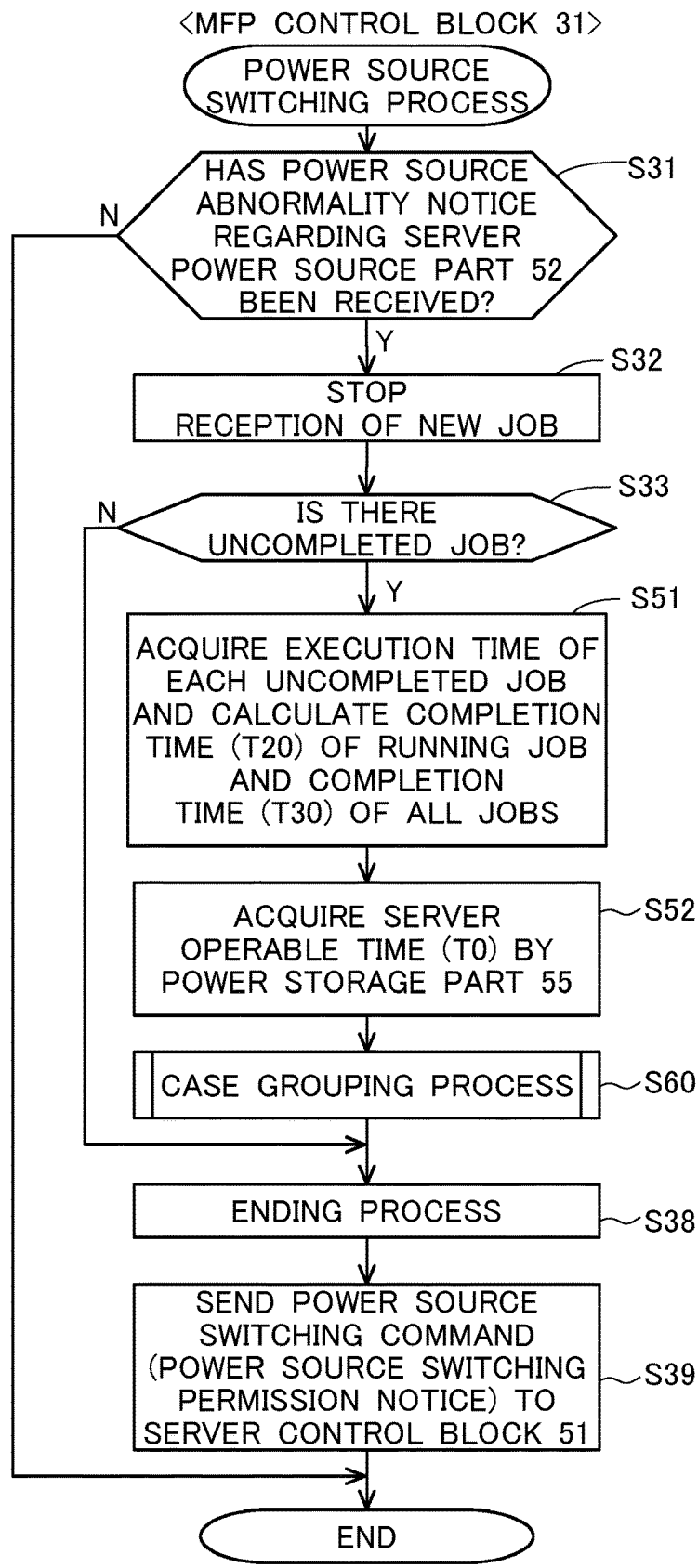
FIG. 11 is a flowchart showing an operation of the MFP control block in accordance with a third preferred embodiment.
Figure 12:
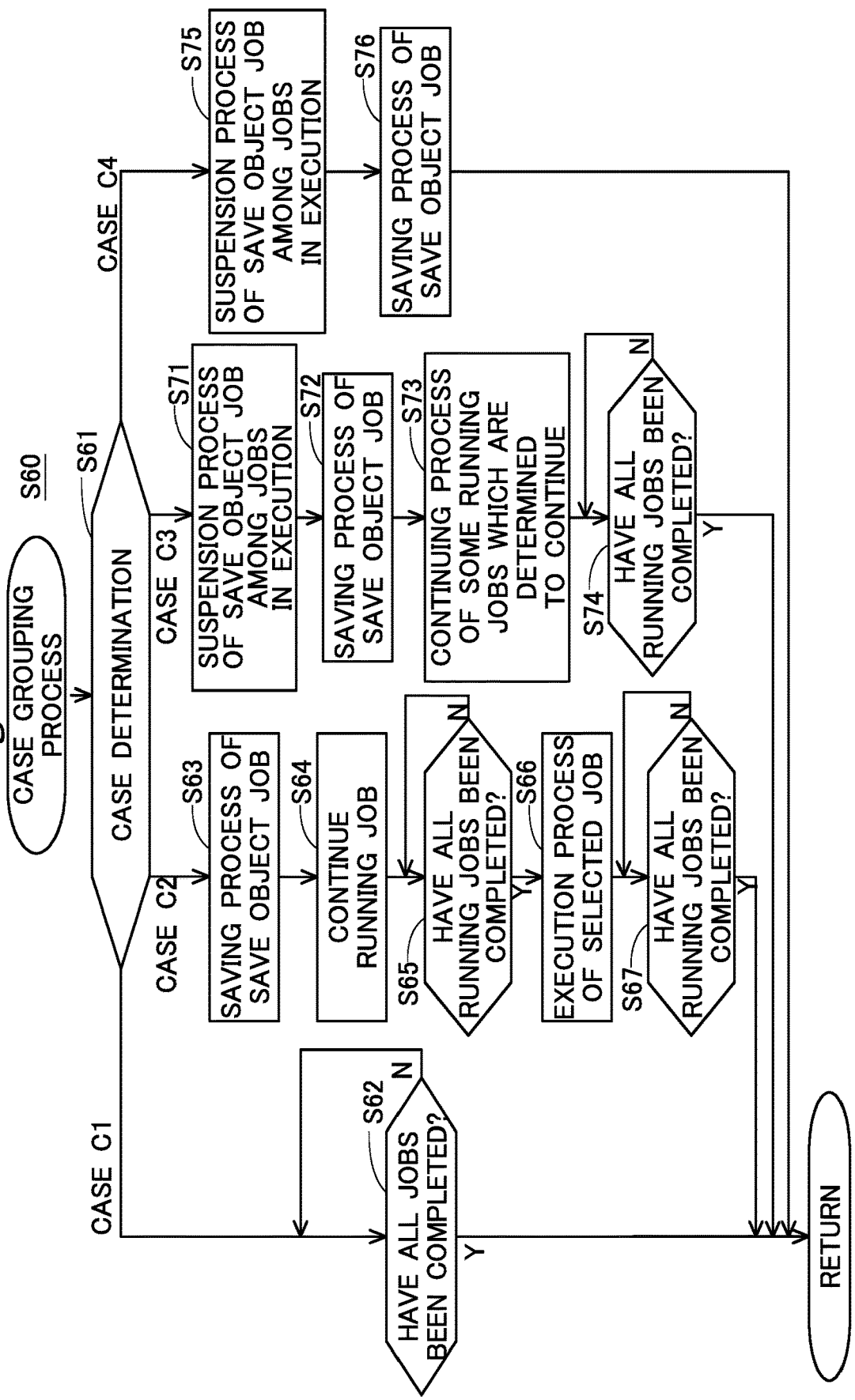
FIG. 12 is a flowchart showing part of the operation of FIG. 11.

Hereinafter, such an operation will be described in detail with reference to FIGS. 11 and 12 and the like. FIGS. 11 and 12 are flowcharts each showing an operation of the MFP control block 31 in accordance with the third preferred embodiment.

Steps S31 and S32 are the same as those in the first preferred embodiment and the like, and in the next step S33, it is determined whether or not there is an uncompleted job (in detail, a received and uncompleted job).

When there is no uncompleted job, the process immediately goes to Steps S38 and S39, and when there is an uncompleted job, the process goes to Step S51.

In Step S51, the MFP control block 31 acquires an execution time t (for example, t1 to t6) of each of all the received jobs (for example, jobs J1 to J6) (also see FIG. 13). Further, the MFP control block 31 calculates a remaining time of the execution time (remaining execution time) T20 of each of the running jobs (for example, jobs J1 to J3). Furthermore, the MFP control block 31 also calculates a time T30 until all the received jobs (for example, jobs J1 to J6) are completed (completion required time which is required to complete all the jobs). The completion required time T30 is not shorter than the remaining execution time T20 (T30≥T20).

In Step S52, the MFP control block 31 calculates the above-described predetermined time T0 (in short, an operable time of the server control block 51 by the electric power stored in the power storage 55) on the basis of the state of charge of the power storage 55 (the state of charge detected by the monitoring circuit 56) or the like.

Then, in Step S60, performed is the branch process based on a length relation (which is longer between two) among the operable time T0, the remaining execution time T20 on all the running jobs, and the completion required time T30 on all the received jobs.

FIG. 13 is a view showing exemplary received jobs, and FIG. 14 is a view in a tabular form showing detailed contents of the branch process in Step S60.

It is assumed herein that six jobs J1 to J6 shown in FIG. 13 are received. Among the six jobs, the jobs J1 to J3 are jobs in current execution (running jobs) and jobs J4 to J6 are waiting jobs (unstarted jobs).

Further, as shown in FIG. 14, a process of grouping into four cases C1 to C4 is performed on the basis of the length relation (which is longer between two) among the operable time T0, the remaining execution time T20, and the completion required time T30.

The case C1 is a case where the operable time T0 is not shorter than the completion required time T30 (T0≥T30), and in other words, a case where it is determined that all the received jobs can be completed.

In this case (where the completion required time T30 does not exceed the operable time T0), all the received jobs are executed. Specifically, the MFP control block 31 waits until all the received jobs are completed, and when all the received jobs are completed, the process goes from Step S62 to Step S38.

The case C2 is a case where the operable time T0 is shorter than the completion required time T30 (T0<T30) and the operable time T0 is not shorter than the remaining execution time T20 (T0≥T20). In other words, the case C2 is a case where it is determined that all the received jobs cannot be completed and all the running jobs (for example, J1 to J3) among all the received jobs can be completed.

In this case (where the completion required time T30 exceeds the operable time T0 and the remaining execution time T20 does not exceed the operable time T0), all the running jobs are executed. Further, in a case where there are some of the unstarted jobs, which can be completed within a time (T0−T20) obtained by subtracting the remaining execution time T20 from the operable time T0, some jobs are also executed. At that time, it is preferable that jobs among the unstarted jobs, which require a relatively short time, are preferentially executed. Further, executions of the remaining jobs are stopped.

For example, among the six jobs J1 to J6, executions of the running jobs J1 to J3 are continued and completed. Further, among the unstarted jobs J4 to J6, some jobs which can be executed within the time (T0−T20) are also determined as execution object jobs. In more detail, the jobs are preferentially determined as the execution object jobs in ascending order from the one which requires the shortest time. For example, among the three jobs J5, J6, and J4 which are arranged in ascending order of length of the required time, the jobs J5 and J6 which can be executed within the time (T0−T20) are determined (selected) as the execution object jobs. Then, executions of the jobs (for example, J5 and J6) determined as the execution object jobs are started and completed. Further, among the plurality of received jobs J1 to J6, execution of the remaining job J4 other than the running jobs J1 to J3 and some of the unstarted jobs J5 and J6 is stopped, and the remaining job J4 is determined as a save object job.

As shown in FIG. 12, as to the case C2, the saving process of the save object job J4 is performed in Step S63. Further, the executions of the running jobs J1 to J3 are continued (in Step S64), and when it is determined that all the executions of the running jobs J1 to j3 are completed (in Step S65), the process goes to Step S66. In Step S66, the executions of the jobs J5 and J6 selected (determined) as the execution object jobs are started. After that, when it is determined that all the executions of the execution object jobs J5 and j6 are completed in Step S67, the process goes to Step S38.

The case C3 is a case where the operable time T0 is shorter than the completion required time T30 (T0<T30), the operable time T0 is shorter than the remaining execution time T20 (T0<T20), and there is a running job (completable job) which can be completed within the operable time T0. In other words, the case C3 is a case where it is determined that only some running jobs (for example, J1 and j2) among all the received jobs (for example, J1 to J6) can be completed. Further, in the row for the case C3 of FIG. 14, as an exemplary case where there is a "completable job" (a running job which can be completed within the operable time T0), shown is a case where the minimum value (Min (t1, t2, and t3)) of the respective required times t1, t2, and t3 of the plurality of running jobs J1, J2, and J3 is shorter than the operable time T0.

In this case (where it is determined that both the completion required time T30 and the remaining execution time T20 exceed the operable time T0 and there are some running jobs (completable jobs) which can be completed within the operable time T0), the executions of the "completable jobs" among the running jobs are continued and completed. At that time, it is preferable that jobs among the running jobs, which require a relatively short time, are preferentially executed. Further, executions of the remaining jobs, among the plurality of received jobs, are suspended or stopped.

For example, among the running jobs J1 to J3, the completable jobs J1 and J2 are determined as the execution object jobs. In more detail, the jobs which require a relatively short time are preferentially determined as the execution object jobs. For example, among the three jobs J2, J1, and J3 which are arranged in ascending order of length of the required time, the jobs J1 and J2 which can be executed within the operable time T0 are determined (selected) as the execution object jobs. Then, executions of the completable jobs (execution object jobs) J1 and J2 are continued and completed. Further, among the plurality of received jobs, execution of the remaining job is suspended or stopped. Specifically, among the plurality of received jobs J1 to J6, execution of the running job J3 is suspended and executions of the unstarted jobs J4 to J6 are stopped. These remaining jobs J3 to J6 are determined as the save object jobs.

As shown in FIG. 12, as to the case C3, the suspension process of the running job (and save object job) J3 is performed in Step S71. Further, in Step S72, the saving process of the save object jobs J3 to J6 (the process of saving the jobs into the nonvolatile storage) is performed. Then, the executions of the completable jobs J1 and J2 among the running jobs, which are determined to be continued, are continued (in Step S73). After that, all the executions of the completable jobs J1 and j2 are completed (in Step S74), the process goes to Step S38.

The case C4 is a case where the operable time T0 is shorter than the completion required time T30 (T0<T30), the operable time T0 is shorter than the remaining execution time T20 (T0<T20), and there is no running job (completable job) which can be completed within the operable time T0. In other words, the case C4 is a case where it is determined that any one of all the running jobs (for example, J1 to J3) cannot be completed. Further, in the row for the case C4 of FIG. 14, as an exemplary case where there is no "completable job" (running job which can be completed within the operable time T0), shown is a case where the minimum value (Min (t1, t2, and t3)) of the respective required times t1, t2, and t3 of the plurality of running jobs J1, J2, and J3 is longer than the operable time T0.

In this case (where it is determined that both the completion required time T30 and the remaining execution time T20 exceed the operable time T0 and there is no running job (completable job) which can be completed within the operable time T0), all the executions of the plurality of received jobs are suspended or stopped. Further, in this case C4, no execution of any unstarted job is started anew. In other words, when there is no completable job among the running jobs, no job among the plurality of received jobs is determined as the execution object job.

For example, all the running jobs J1 to J3 are determined as the save object jobs and all the unstarted jobs J4 to J6 are determined as the save object jobs. Then, the executions of the save object jobs J1 to J6 are suspended or stopped. Specifically, the executions of the job J1 to J3 are suspended and the executions of the job J4 to J6 are stopped.

As shown in FIG. 12, as to the case C4, the suspension process of the save object jobs (running jobs) J1 to J3 is performed in Step S75. Further, in Step S76, the saving process of the save object jobs J1 to J6 (the process of saving the jobs into the nonvolatile storage) is performed. Then, the process goes to Step S38.

Like in the second preferred embodiment, the operation of Step S38 and the following operations are performed.

With the above-described operation, the same effects as those in the second preferred embodiment are produced.

In the third preferred embodiment, in a case where there are a plurality of uncompleted jobs (received jobs) in the occurrence of abnormality of the server power source 52, when it is determined that all the plurality of uncompleted jobs can be completed within the above-described extension period (the server operable time T0 using the power storage 55) (case C1), all the plurality of jobs are executed and completed. Then, after the plurality of uncompleted jobs are completed, the switching of the power supply target of the MFP power source 32 is performed. Therefore, before the power supply target of the MFP power source 32 is switched from the MFP control block 31 to the server control block 51, it is possible to execute as many jobs as possible.

Further, in the case C2 and the case C3, the executions of only some jobs among the plurality of jobs, which can be completed within the predetermined time T0, are continued or started and completed. In the case C2, for example, among the plurality of jobs J1 to J6, the executions of the jobs J1 to J3 which can be completed within the predetermined time T0 are continued and the executions of the jobs J5 and J6 which can be completed within the predetermined time T0 are started, and the executions of the jobs J1 to J3, J5, and J6 are completed. Further, in the case C3, among the plurality of jobs J1 to J6, the executions of only the jobs J1 and J2 which can be completed within the predetermined time T0 are continued and completed. Therefore, before the power supply target of the MFP power source 32 is switched from the MFP control block 31 to the server control block 51, it is possible to execute as many jobs as possible.

Further, the save object jobs which are saved into the nonvolatile storage during the above-described extension period may be performed, for example, after the abnormality of the server power source 52 is resolved. Alternatively, as described later, the save object jobs may be performed by using the electric power supplied from the MFP power source 32 after the power storage 55 is charged again.

4. The Fourth Preferred Embodiment

The fourth preferred embodiment is a variation of the third preferred embodiment.

In the second preferred embodiment and the third preferred embodiment, in a case where a power source abnormality occurs in the server power source 52, the server control block 51 operates for a while by using the electric power supply from the power storage 55 (see FIG. 5). Then, for example, after some execution object jobs are executed and the save object jobs are saved into the nonvolatile storage during the electric power supply from the power storage 55, the power supply target of the MFP power source 32 is switched from the MFP control block 31 to the server control block 51 (see FIG. 6). Then, the server control block 51 continuously operates by the electric power supply from the MFP power source 32. Herein, during the electric power supply from the MFP power source 32 to the server control block 51 (electric power supply through the power supply lines L1, L3, and L5), the power storage 55 is charged again by the electric power supply from the MFP power source 32.

In the fourth preferred embodiment, after that, the power supply target of the MFP power source 32 is switched (returned) from the server control block 51 to the MFP control block 31 (see FIG. 15). Then, in this state (see FIG. 15), the operation of the server control block 51 is continued by using the electric power of the power storage 55 which is charged again in the state of FIG. 6 and the MFP control block 31 executes the save object job which is saved in the nonvolatile storage, by using the electric power supply from the MFP power source 32. Further, FIG. 15 is a view showing a state in which the power supply target of the MFP power source 32 is returned to the MFP control block 31 in the fourth preferred embodiment.

Hereinafter, as to such an exemplary case, description will be made, centering on the difference between the third and fourth preferred embodiments.

Figure 16:
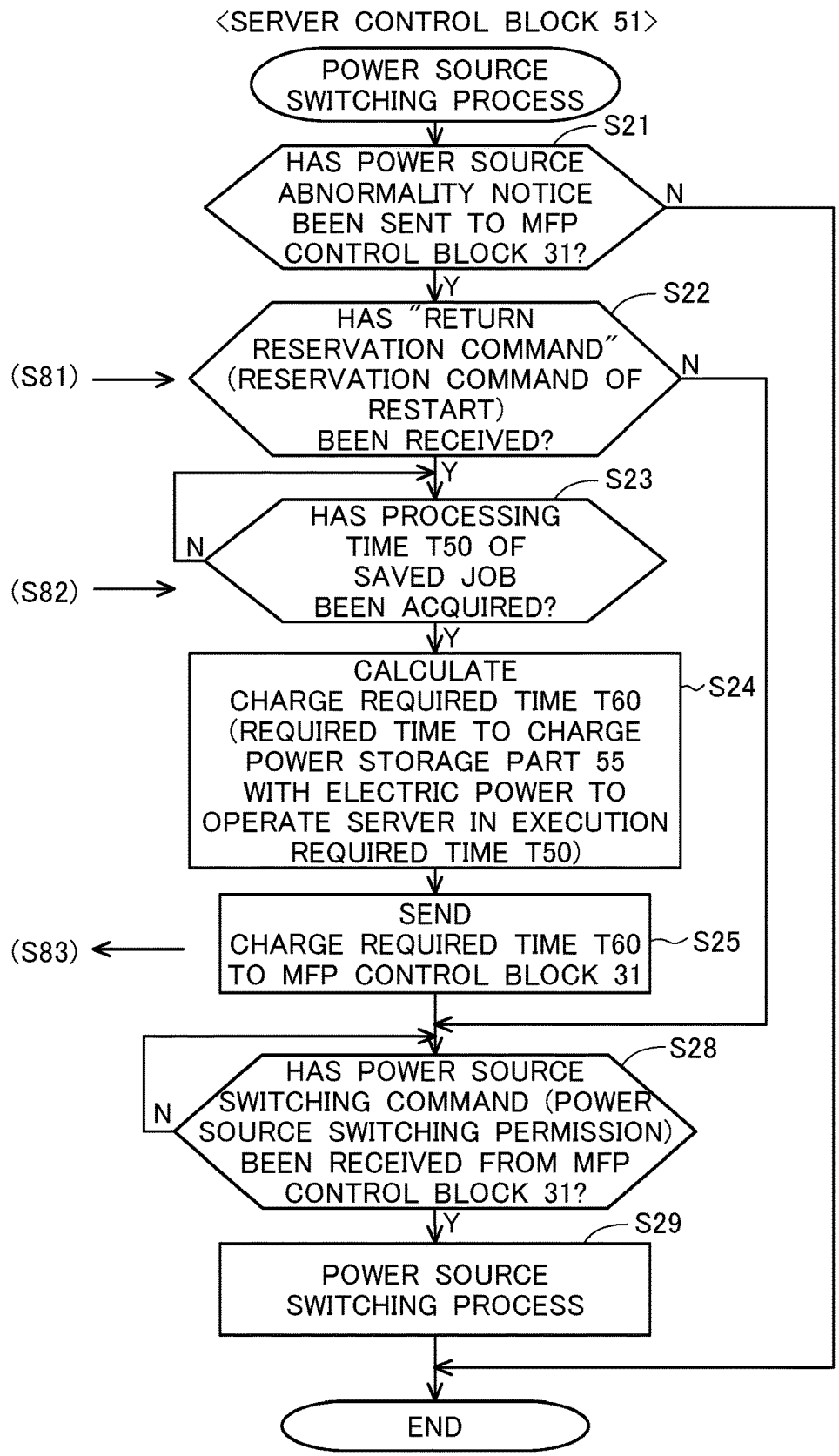
FIG. 16 is a flowchart showing an operation of the server control block in accordance with the fourth preferred embodiment.
Figure 17:
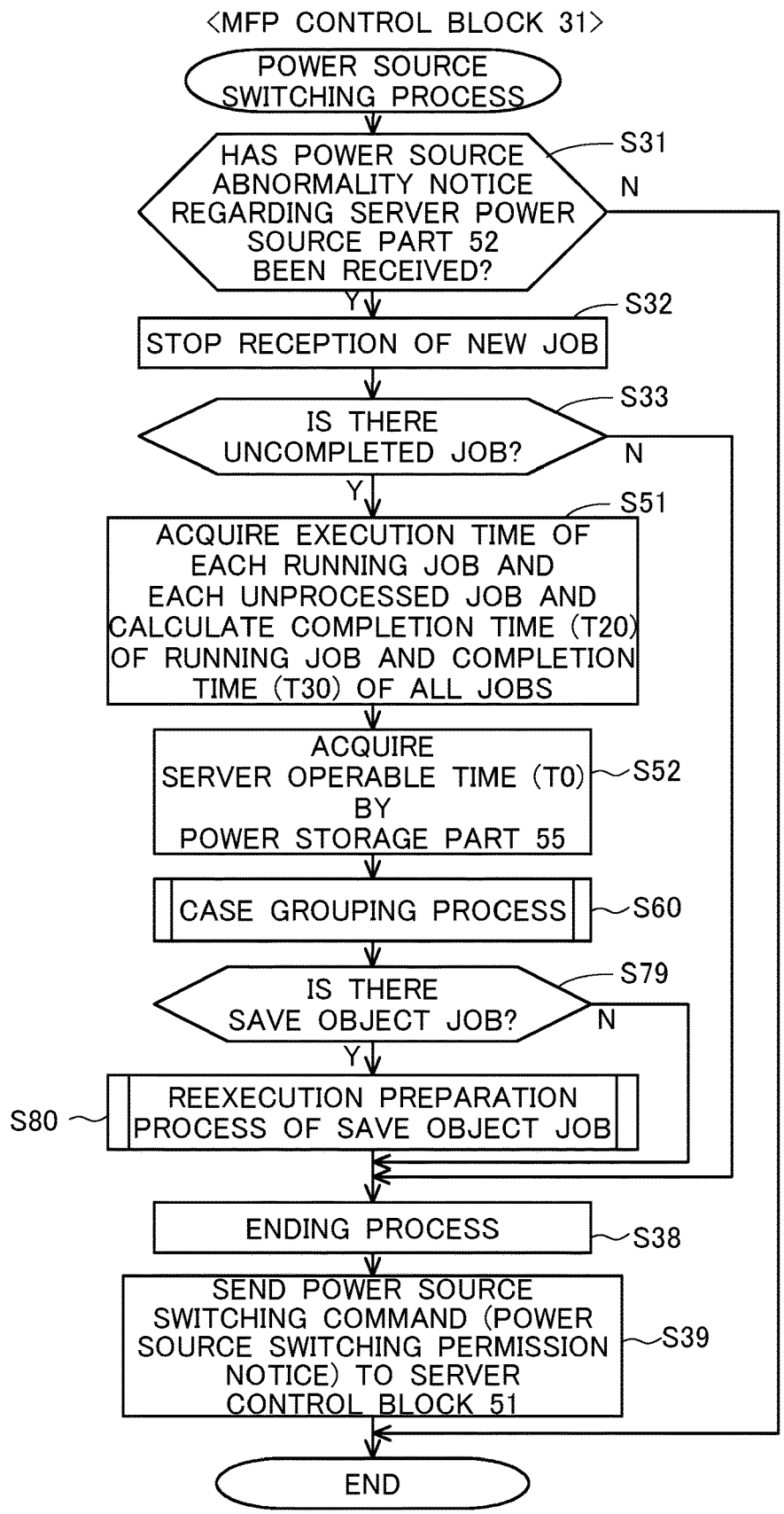
FIG. 17 is a flowchart showing an operation of the MFP control block in accordance with the fourth preferred embodiment.
Figure 18:
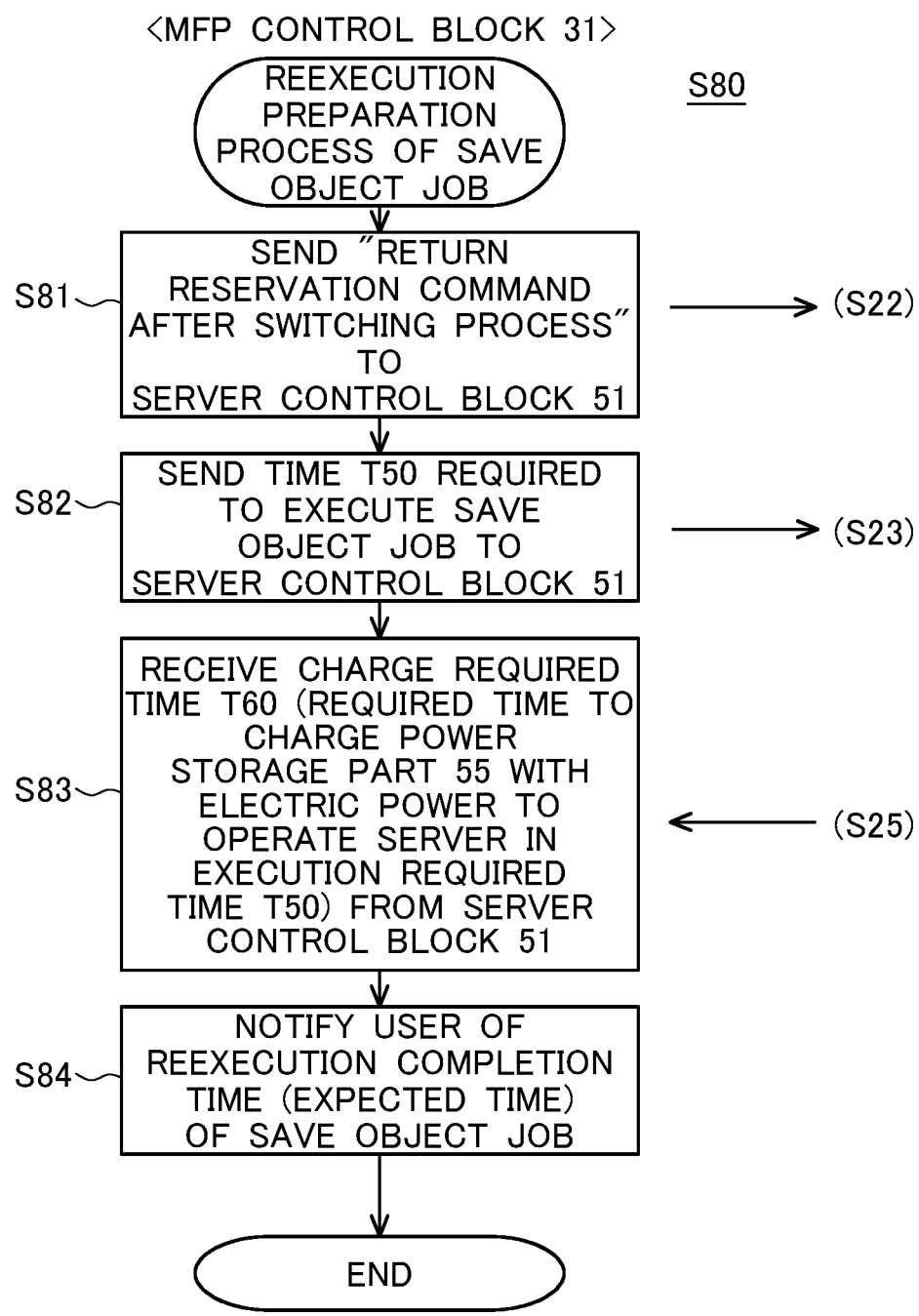
FIG. 18 is a flowchart showing part of the operation of FIG. 17.

FIG. 16 is a flowchart showing an operation of the server control block 51 (server processing part), and FIGS. 17 and 18 are flowcharts each showing an operation of the MFP control block 31 (MFP processing part). In the fourth preferred embodiment, the process of FIG. 16 is performed, instead of the process of FIG. 8, and the process of the FIG. 17 (and FIG. 18) is performed, instead of the process of FIG. 11.

First, in a state where in response to the occurrence of abnormality of the server power source 52, the electric power is supplied from the power storage 55 to the server control block 51 and the electric power is supplied from the MFP power source 32 to the MFP control block 31 (see FIG. 5), the process of FIG. 17 is performed in the MFP control block 31 and the process of FIG. 7 is performed in the server control block 51. In FIG. 17, the operations in Steps S31 to S33, S51, S52, S60 (also see FIG. 12), S79, S80 (also see FIG. 18), S38, and S39 are performed. In Step S60, the above-described saving process and the like can be performed.

The process of FIG. 17 is, however, different from the process of FIG. 11 in that the operations in Steps S79 and S80 (see FIG. 18) are further performed immediately before Step S38.

In Step S79, it is determined whether or not there is a job which is saved in Step S60 (see FIG. 12). When there is no job which is saved, the process goes to Step S38. On the other hand, when there is a job which is saved, the process goes to Step S80 (see FIG. 18). It can be expressed that the operation in Step S80 is a preparation process for performing the save object job again.

Specifically, as shown in FIG. 18, in Step S81, first, the MFP control block 31 notifies the server control block 51 of a "return reservation command after switching process" before the switching request of the power supply target of the MFP power source 32 (in detail, a request for a switching process of switching the power supply target of the MFP power source 32 from the MFP control block 31 to the server control block 51, which will be given from the server control block 51 to the MFP control block 31 later) (see Step S39).

This "return reservation command after switching process" is a reservation command indicating that after the switching process (FIG. 5 to FIG. 6) is performed in response to the switching request (power source switching command), a switching process (return process) (FIG. 6 to FIG. 15) of switching (returning) the power supply target of the MFP power source 32 from the server control block 51 to the MFP control block 31 in turn should be performed in the server control block 51. In other words, the "return reservation command after switching process" is a command for notifying in advance before the switching process, that the power supply target of the MFP power source 32 should be returned to the MFP control block 31 after the switching process (the process of switching the power supply target of the MFP power source 32 to the server control block 51) is performed. It can be expressed that the "return reservation command after switching process" is a command (reservation command for restart) for notifying in advance a restart request to restart the MFP control block 31 by re-energization of the MFP control block 31. The "return reservation command after switching process" is, however, a command (reservation command) for notifying in advance that the return process should be performed after the switching process as described above. The actual return process (restart process) is performed after the switching process (see Steps S39 (FIG. 17), S29 (FIG. 16), and the like after Step S80) is performed and the recharge of the power storage 55 is performed.

Further, in Step S82, the MFP control block 31 calculates a time (execution required time) T50 required to execute the save object job and sends the calculated execution required time T50 to the server control block 51. The execution required time T50 is an execution required time required to execute the save object job after the power supply target of the MFP power source 32 is returned from the server control block 51 to the MFP control block 31 (in the state of FIG. 15).

Herein, see FIG. 16. When it is determined in Step S21 that the server control block 51 has already sent the power source abnormality notice to the MFP control block 31 (in Step S12 (FIG. 7)), the process goes to Step S22. Further, it is determined in Step S22 that the server control block 51 has received the "return reservation command after switching process" (Step S81) from the MFP control block 31, the process goes to Step S23. Then, it is determined in Step S23 that the server control block 51 has received the "execution required time T50 of the save object job" (Step S82) from the MFP control block 31, the process goes to Step S24.

In Step S24, a charge required time T60 for the electric power for the server operation is calculated. The charge required time T60 is a charge time required to ensure (charge) the power storage 55 with the amount of electric power for the server operation in the execution required time T50 (the amount of electric power required to perform (continue) the server operation over the execution required time T50 of the save object job). In more detail, the charge required time T60 is a required time until the power storage 55 is charged again with a predetermined amount of electric power (the amount of electric power for the server operation) in a period from the point in time when the power supply target of the MFP power source 32 is switched first to the server control block 51 to the point in time when the power supply target is returned from the server control block 51 to the MFP control block 31 (in the state of FIG. 6). In short, the charge required time T60 is a time required to charge the power storage 55 to the level of the amount of electric power for the server operation in the state of FIG. 6 after the power consumption of the power storage 55 in the state of FIG. 5. Further, the charge required time T60 is also a period T60 while the electric power supply to the server control block 51 is continued by the MFP power source 32 in the state of FIG. 6. It can be expressed that the charge required time T60 is a period from the point in time of the first switching process (FIG. 5 to FIG. 6) to the point in time of the return process (FIG. 6 to FIG. 15) (a period until the point in time when the electric power supply to the MFP control block 31 is resumed), or the like. The charge required time T60 is calculated, for example, as a charge time (for example, five minutes) required to recover the stored electric power of the power storage 55, which has been reduced to a relatively low charge level (10%) to a full charge level (100%).

Then, in Step S25, the charge required time T60 is notified from the server control block 51 to the MFP control block 31.

See FIG. 17 again.

In Step S83, when the MFP control block 31 receives the notice regarding the "charge required time T60" from the server control block 51, the process goes to Step S84. In Step S84, the MFP control block 31 calculates an expected completion time of the save object job on the basis of the charge required time T60 regarding the power storage 55 and the execution required time T50 of the save object job.

Specifically, after the power supply target of the MFP power source 32 is switched from the MFP control block 31 to the server control block 51 in response to the operations in Steps S39 and S29 immediately after, when the charge required time T60 regarding the power storage 55 elapses and further the charge for the server operation is completed, the power supply target of the MFP power source 32 is returned from the server control block 51 to the MFP control block 31. Then, in a state where the electric power is supplied from the MFP power source 32, the save object job is executed. Therefore, for example, a time (fifteen minutes) obtained by adding the charge required time T60 (five minutes) for the electric power for the server operation and the execution required time T50 (ten minutes) of the save object job is calculated as a time (expected completion time of the save object job) required to complete the save object job from the present time (more exactly, the point in time of switching in Step S29). Further, the expected completion time may be notified as an expected completion hour of the save object job. If the present time is just ten o'clock, for example, ten o'clock fifteen minutes that is fifteen minutes later is calculated (estimated) as the expected completion hour of the save object job.

Then, the MFP control block 31 notifies an execution user of the save object job of the calculated expected completion time. Specifically, by displaying the calculated expected completion time on the touch panel 25, the notice is given to the execution user who is present near the MFP 10, and the expected completion time of the save object job is notified to the execution user of the save object job by using an electronic mail or the like. Thus, before the power supply target of the MFP power source 32 is switched to the server control block 51, the MFP control block 31 calculates the expected completion time and notifies the user of the calculated expected completion time.

After that, the operations in Steps S38 and S39 are performed. Specifically, when the MFP control block 31 completes the process before the switching (including the ending process of Step S38), the power source switching command (power source switching permission notice) is sent from the MFP control block 31 to the server control block 51 (in Step S39).

On the other hand, in Step S28 (FIG. 16), when it is determined that the server control block 51 has received the power source switching command from the MFP control block 31, the process goes to Step S29.

In Step S29, in response to the power source switching command sent from the MFP control block 31 in Step S39 (see FIG. 17), the power source switching process is performed by the server control block 51. By performing the power source switching process (also referred to as a first switching process), the state is changed from that of FIG. 5 to that of FIG. 6.

As described above, in the state of FIG. 6, since the electric power supply from the MFP power source 32 to the MFP control block 31 is stopped, the MFP control block 31 is brought into a halt state. Further, receiving the electric power supply from the MFP power source 32 (electric power supply through the power supply lines L1, L3, and L5), the server control block 51 operates. Furthermore, the power storage 55 is gradually recharged in response to the electric power supply from the MFP power source 32 through the power supply lines L1, L3, and L5. The amount of charged power in the power storage 55, which has been reduced in response to the electric power supply (see FIG. 5) to the server control block 51 after the occurrence of abnormality of the server power source 52, is thereby recovered.

Then, when it is determined that a predetermined amount of power is ensured (charged) again in the power storage 55, the server control block 51 performs a reswitching process (also referred to as the return process) of switching (returning) the power supply target of the MFP power source 32 from the server control block 51 to the MFP control block 31. Further, whether or not the predetermined amount of power is ensured (charged) again in the power storage 55 (whether or not the power storage 55 is recharged to the level of the amount of power) may be determined on the basis of a detection result on the state of charge made by the monitoring circuit 56. Alternatively, whether or not the predetermined amount of power is ensured again in the power storage 55 may be determined on the basis of whether or not the charge required time T60 (the required time calculated in the above-described step S24) of the electric power for the server operation elapses from the point in time of starting the recharge of the power storage 55 (the point in time of changing the state into that of FIG. 6).

By performing the reswitching process (the second switching process), the state is changed from that of FIG. 6 to that of FIG. 15. In the reswitching process, the switching signal SG1 is sent from the server control block 51 to the first power source switching circuit 33 and switching to the MFP-side terminal is performed in the first power source switching circuit 33 (SW1). In more detail, the state is switched from the state in which the power supply line L3 is connected to the power supply line L1 to the state in which the power supply line L4 is connected to the power supply line L1. Further, the connection in the second power source switching circuit 53 is not changed.

When the state is returned to the energization state (see FIG. 15) in response to the reswitching process, the MFP control block 31 performs the job (also referred to as a saved job) saved in the nonvolatile storage as the save object job. Further, the process performed in the MFP control block 31 after the energization return (restart) is different from the process in the flowchart of FIG. 17. Specifically, though not shown in a flowchart, the MFP control block 31 reads out the saved job (in detail, data thereof and the like) from the nonvolatile storage and executes the job. The operation of executing the saved job performed by the MFP control block 31 is performed by using the electric power supplied from the MFP power source 32. Further, in the execution period of the saved job, the server control block 51 performs the server operation by using the electric power supply from the power storage 55. In the power storage 55, the amount of electric power required to perform the server operation in the execution required time T50 of the saved job is stored during the above-described recharge period. In other words, over the period while the MFP control block 31 completes the execution of all the saved jobs, the server control block 51 can operate by the electric power supply from the power storage 55.

Next, when execution of all the saved jobs is completed, the MFP control block 31 sends the second power source switching command to the server control block 51.

The process performed by the server control block 51 when the second power source switching command is received is different from the process in the flowchart of FIG. 16. (though not shown in a flowchart,) The server control block 51 performs the switching process again (the third switching process) in response to the second power source switching command. The state is thereby returned from that of FIG. 15 to that of FIG. 6. Specifically, the server control block 51 sends the switching signal SG1 to the first power source switching circuit 33, and switching to the server-side terminal is performed in the first power source switching circuit 33 (SW1). In other words, the state is switched from the state in which the power supply line L4 is connected to the power supply line L1 to the state in which the power supply line L3 is connected to the power supply line L1. Further, the connection in the second power source switching circuit 53 is not changed. The electric power supply from the MFP power source 32 to the server control block 51 (and 55) is thereby started again through the power supply lines L1, L3, and L5. Specifically, the power supply target of the MFP power source 32 is switched again to the server control block 51, and the server control block 51 performs the server operation and the like by the electric power supply from the MFP power source 32.

With the above-described operations, executed is the job (saved job) which is saved in Step S60 before the first switching process in the period while the operation of the server control block 51 continues (in the state of FIG. 15) after the return process (second switching process) by using the electric power of the power storage 55 recharged after the first switching process (in the state of FIG. 6). Therefore, it is possible to execute the saved job by using the electric power supply from the MFP power source 32 while continuing the operation of the server control block 51 by effectively using the power storage 55 and the MFP power source 32.

Further, after the third switching process, the server control block 51 can perform the server operation by using the electric power supply from the MFP power source 32.

Furthermore, though description has been made herein, centering on the modifications of the third preferred embodiment, the same modifications can be applied to the second preferred embodiment and the like.

5. Variations, Etc

Though the preferred embodiments of the present invention have been described above, the present invention is not limited to the above-described exemplary cases.

For example, though the predetermined time T0 is calculated on the basis of the state of charge (state of charge of the power storage 55) detected by the monitoring circuit 56 in the second preferred embodiment and the like, the present invention is not limited to this exemplary case, and the predetermined time T0 may be a fixed value (for example, a value determined on the assumption that the charge level is 70%) which is determined in advance, or the like.

Further, in the third preferred embodiment, when any one of the running jobs J1 to J3 cannot be completed within the operable time T0 in the case C4, any one of all the received jobs J1 to J6 is not determined as the execution object job. The present invention is not limited to the exemplary case, however, when there is a job (completable job) which can be completed within the operable time T0 among the unstarted jobs, the job (completable job) may be determined as the execution object job. In this case, among all the received jobs, the remaining job other than the execution object job may be determined as the save object job. For example, the unstarted job J5 may be determined as the execution object job and the other jobs J1 to J4 and J6 may be determined as the save object jobs. Then, the executions of the save object jobs J1 to J4 and J6 may be suspended or stopped.

Similarly, though only some of the running jobs J1 to J3 are executed in the case C3 in the above-described third preferred embodiment, the present invention is not limited to this exemplary case. Besides some (for example, the jobs J2 and J1) of the running jobs J1 to J3, some jobs are executed and an unstarted job (for example, the job J5) which can be further executed within the operable time T0 may be also determined as the execution object job.

Further, in the above-described third preferred embodiment, when it is determined that the completion required time T30 regarding all the received jobs exceeds the predetermined time T0, the jobs in execution at the point in time of the occurrence of abnormality, among all the received jobs (uncompleted jobs), are preferentially executed and the jobs which require a relatively short time, among the jobs in execution, are preferentially executed. The present invention is, however, not limited to this exemplary case, and for example, the jobs which require a relatively short time, among the plurality of received jobs regardless of whether in execution or not, may be preferentially executed. In other words, the execution object job may be determined with the required time used as a reference, without necessarily giving priority to the jobs in execution.

Furthermore, though the operation of the MFP control block 31 is stopped after the ending process in Step S38 is completed in the above-described preferred embodiments, the present invention is not limited to this exemplary case. For example, after completing Step S60 (see FIG. 1) or Step S80 (see FIG. 17), or the like, the operation of the MFP control block 31 may be stopped without performing Step S38, and then the operation in Step S39 may be immediately performed.

Further, in the above-described preferred embodiments, in the case where it is determined which is larger (longer) between two amounts, when the two amounts are equal to each other, either the operation in a case where one of the two is larger or the operation in another case where the other is larger may be performed.

Furthermore, though the MFP control block 31 is exemplarily shown as the first processor and the server control block 51 is exemplarily shown as the second processor in the above-described preferred embodiments, the present invention is not limited to this exemplary case. For example, a finisher processor (a finisher controller which is a processor to implement a finisher function (a punch function, a staple function, and/or the like) in the MFP 10) may be provided as the first processor, and the MFP control block 31 may be provided as the second processor. Then, in the state of normal operation, a finisher power source (first power source) which supplies electric power to the finisher processor and the MFP power source (second power source) which supplies electric power to the MFP control block 31 may be provided, and when an abnormality occurs in the MFP power source, the above-described same idea may be applied to the case. In such a case, even when an abnormality occurs in one (the MFP power source or the like) of the two power sources, it is thereby possible to avoid stopping the function (MFP function) corresponding to the one power source and suppress an increase in cost.

Although embodiments of the present invention have been described and illustrated in detail, it is clearly understood that the same is by way of illustration and example only and not limitation, the scope of the present invention should be interpreted by terms of the appended claims.

What is claimed is:

1. A data processing apparatus comprising:
    a first processor;
    a second processor;
    a first power source which performs electric power supply to said first processor;
    a second power source which performs electric power supply to said second processor;
    a detector which detects an abnormality of said second power source; and
    a switcher which is capable of switching a power supply target of said first power source between said first processor and said second processor,
    said first processor stops an operation of said first processor upon detection of an abnormality of said second power source, and
    after said operation of said first processor is stopped, said switcher switches said power supply target of said first power source from said first processor to said second processor.

2. The data processing apparatus according to claim 1, further comprising:
    a power storage which is capable of storing electric power from said second power source during a normal operation of said second power source,
    wherein said power storage supplies said electric power stored in said power storage to said second processor in a period after said abnormality of said second power source occurs until said power supply target of said first power source is switched from said first processor to said second processor.

3. The data processing apparatus according to claim 2, wherein
    when said abnormality of said second power source is detected, said first processor stops said operation of said first processor after an operation of said second processor is continued by electric power supply from said power storage and said operation of said first processor is continued for a while by said electric power supply from said first power source.

4. The data processing apparatus according to claim 3, wherein
    when said abnormality of said second power source is detected, said first processor stops said operation of said first processor before a predetermined time elapses.

5. The data processing apparatus according to claim 4, wherein
    said predetermined time is a time determined as a period in which said second processor is capable of operating by said electric power stored in said power storage.

6. The data processing apparatus according to claim 5, wherein
    in a case where a running job which is a job in execution of a processing of said first processor is present during occurrence of said abnormality of said second power source, when it is determined that a time required to complete said running job is shorter than said predetermined time, said first processor stops said operation of said first processor after said first processor completes said running job.

7. The data processing apparatus according to claim 5, wherein
    in a case where a plurality of received jobs on each of which a processing of said first processor is not completed are present during occurrence of said abnormality of said second power source, when it is determined that a first period which is a period until all said plurality of received jobs are completed is shorter than said predetermined time, said first processor stops said operation of said first processor after completing all said plurality of received jobs.

8. The data processing apparatus according to claim 7, wherein
    in a case where said plurality of received jobs are present during occurrence of said abnormality of said second power source, when it is determined that said first period exceeds said predetermined time, said first processor continues or starts execution of only some received jobs which can be completed within said predetermined time, among said plurality of received jobs, and completes also said some received jobs, and then stops said operation of said first processor.

9. The data processing apparatus according to claim 8, wherein
    in a case where said plurality of received jobs are present during occurrence of said abnormality of said second power source, when it is determined that said first period exceeds said predetermined time, said first processor preferentially performs jobs in execution out of said plurality of received jobs.

10. The data processing apparatus according to claim 8, wherein
    in a case where said plurality of received jobs are present during occurrence of said abnormality of said second power source, when it is determined that said first period exceeds said predetermined time, said first processor preferentially performs jobs each having a shorter required time than remaining jobs out of said plurality of received jobs.

11. The data processing apparatus according to claim 8, wherein in a case where said plurality of received jobs are present during occurrence of said abnormality of said second power source, when it is determined that said first period exceeds said predetermined time and a second period which is a period until all running jobs which are jobs in execution out of said plurality of received jobs are completed does not exceed said predetermined time, said first processor stops said operation of said first processor after completing all said running jobs.

12. The data processing apparatus according to claim 11, wherein in a case where said plurality of received jobs are present during occurrence of said abnormality of said second power source, when it is determined that said first period exceeds said predetermined time and said second period does not exceed said predetermined time, said first processor performs all running jobs and also performs some of unstarted jobs which can be performed within a time obtained by subtracting a time required for execution of all said running jobs from said predetermined time, and said first processor stops said operation of said first processor after completing all said running jobs and said some unstarted jobs.

13. The data processing apparatus according to claim 11, wherein in a case where said plurality of received jobs are present during occurrence of said abnormality of said second power source, when it is determined that both said first period and said second period exceed said predetermined time and there is a completable job that is a job in execution, which can be completed within said predetermined time, said first processor continues said execution of said completable job among said plurality of received jobs and completes said completable job, and then stops said operation of said first processor.

14. The data processing apparatus according to claim 13, wherein in a case where said plurality of received jobs are present during occurrence of said abnormality of said second power source, when it is determined that both said first period and said second period exceed said predetermined time and there is not said completable job, said first processor suspends or stops all executions of said plurality of received jobs.

15. The data processing apparatus according to claim 8, wherein in a case where said plurality of received jobs are present during occurrence of said abnormality of said second power source, when it is determined that said first period exceeds said predetermined time, said first processor suspends or stops execution of remaining jobs other than said some jobs which can be completed within said predetermined time, among said plurality of received jobs.

16. The data processing apparatus according to claim 14, wherein during occurrence of said abnormality of said second power source, said first processor stops said operation of said first processor after saving data on a save object job which is a job suspended or stopped into a non-volatile storage.

17. The data processing apparatus according to claim 1, said data processing apparatus being an image processing apparatus, wherein said first processor is a processor to implement an image processing function in said image processing apparatus, and said second processor is a processor to implement a server function in said image processing apparatus.

18. The data processing apparatus according to claim 1, said data processing apparatus being an image processing apparatus, wherein said first processor is a processor to implement a finisher function in said image processing apparatus, and said second processor is a processor to implement an image processing function in said image processing apparatus.

19. A data processing apparatus comprising:

a first processor;
a second processor;
a first power source which performs electric power supply to said first processor;
a second power source which performs electric power supply to said second processor;
a detector which detects an abnormality of said second power source; and
a switcher which is capable of switching a power supply target of said first power source between said first processor and said second processor,
wherein when an abnormality of said second power source is detected,
said first processor stops an operation of said first processor, and
said switcher switches said power supply target of said first power source from said first processor to said second processor;
wherein:
in a case where a running job which is a job in execution of a processing of said first processor is present during occurrence of said abnormality of said second power source, when it is determined that a time required to complete said running job is shorter than said predetermined time, said first processor stops said operation of said first processor after said first processor completes said running job; and
in a case where said running job is present during occurrence of said abnormality of said second power source, when it is determined that said time required to complete said running job exceeds said predetermined time, said first processor suspends said running job.

20. The data processing apparatus according to claim 19, wherein in a case where an unstarted job is present during occurrence of said abnormality of said second power source, said first processor stops execution of said unstarted job.

21. The data processing apparatus according to claim 20, wherein during occurrence of said abnormality of said second power source, said first processor stops said operation of said first processor after saving data on a save object job which is a job suspended or stopped into a non-volatile storage.

22. The data processing apparatus according to claim 21, wherein said switcher returns said power supply target of said first power source from said second processor to said first processor on the condition that said power storage is charged again with a predetermined amount of electric power by electric power supply from said first power source, and after said power supply target of said first power source is returned to said first processor, said first processor performs said save object job by using said electric power supply from said first power source on the basis of said data saved in said nonvolatile storage, and said second processor continues said operation of said second processor by using said electric power charged in said power storage.

23. The data processing apparatus according to claim 22, wherein said predetermined amount of electric power is the amount of electric power, which is required to perform said operation of said second processor over an execution required period of said save object job.

24. The data processing apparatus according to claim 23, wherein before said power supply target of said first power source is switched from said first processor to said second processor, said first processor calculates an expected completion time of said save object job on the basis of a charge required time and an execution required time, said charge required time being required to charge again said power storage with said predetermined amount of electric power in a period from a point in time when said power supply target is switched to said second processor to a point in time when said power supply target is returned from said second processor to said first processor, said execution required time being required to perform said save object job after said power supply target is returned from said second processor to said first processor, and said first processor notifies a user of said expected completion time.

25. The data processing apparatus according to claim 22, wherein when execution of said save object job is completed, said switcher switches again said power supply target of said first power source from said first processor to said second processor.

26. A method of controlling a data processing apparatus which comprises a first processor, a second processor, a first power source which performs electric power supply to said first processor, and a second power source which preforms electric power supply to said second processor, to perform:

a) detecting an abnormality of said second power source;

b) upon the detection of the abnormality of said second power source, stopping an operation of said first processor; and c) switching a power supply target of said first power source from said first processor to said second processor after said operation b).

27. A non-transitory computer-readable recording medium for recording therein a computer program which causes a computer controlling said data processing apparatus to execute the method as defined in claim 26.

* * * * *